(12) United States Patent  (10) Patent No.: US 7,638,231 B2
Kurosawa  (45) Date of Patent: Dec. 29, 2009

(54) BATTERY CASE

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 747 days.

(21) Appl. No.: 11/348,377

(22) Filed: Feb. 7, 2006

(65) Prior Publication Data

US 2006/0178040 A1    Aug. 10, 2006

(30) Foreign Application Priority Data

Feb. 8, 2005 (JP) ............................. 2005-031318
Feb. 8, 2005 (JP) ............................. 2005-031319
Feb. 8, 2005 (JP) ............................. 2005-031320

(51) Int. Cl.
*H01M 2/10* (2006.01)
(52) U.S. Cl. ........................ 429/97; 429/99; 429/100
(58) Field of Classification Search ............... 429/97, 429/99, 100
See application file for complete search history.

(56) References Cited

U.S. PATENT DOCUMENTS

| | | | |
|---|---|---|---|
| 4,863,812 A | 9/1989 | Ueda et al. | |
| 5,315,336 A | 5/1994 | Suzuka et al. | |
| 5,626,979 A * | 5/1997 | Mitsui et al. | 429/97 |
| 6,301,448 B1 | 10/2001 | Ono | |
| 7,105,247 B2 * | 9/2006 | Suzuki | 429/96 |
| 2004/0229111 A1 * | 11/2004 | Kurosawa | 429/96 |

FOREIGN PATENT DOCUMENTS

JP    2002-208387    7/2002

* cited by examiner

*Primary Examiner*—Dah-Wei D Yuan
*Assistant Examiner*—Jacob Marks
(74) *Attorney, Agent, or Firm*—Greenblum & Bernstein P.L.C.

(57) ABSTRACT

A battery case includes a box portion forming a battery chamber in which at least one short-length battery and at least one long-length battery can be selectively accommodated along a lengthwise direction of the box portion through an insertion opening thereof; a battery chamber lid for closing the insertion opening; at least one battery locking lug which is engaged with the long-length battery to lock the long-length battery in the box portion upon the long-length battery being inserted into the box portion; and at least one lock releasing piece which disengages the battery locking lug from the long-length battery when the battery chamber lid is opened from a closed state thereof.

12 Claims, 30 Drawing Sheets

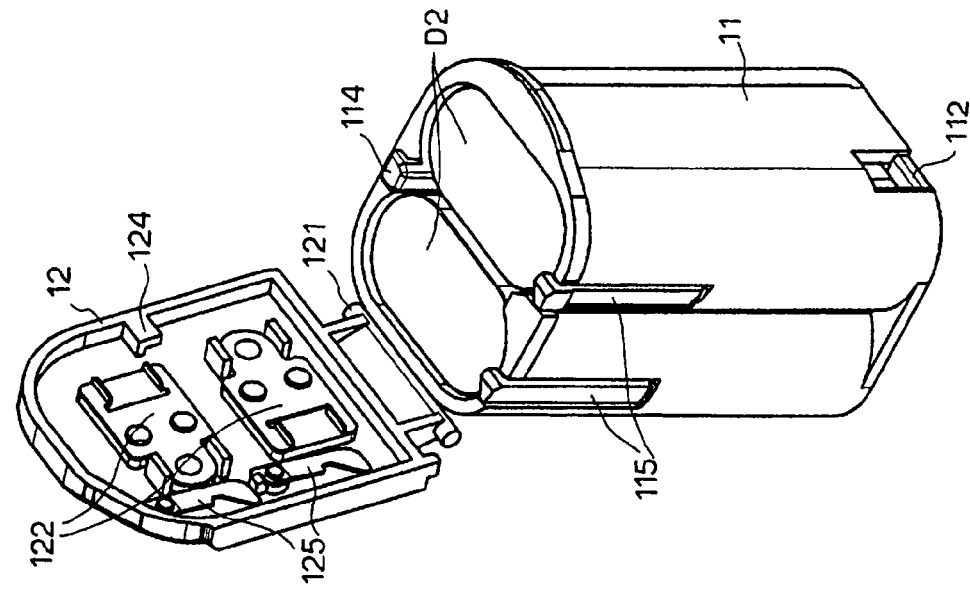
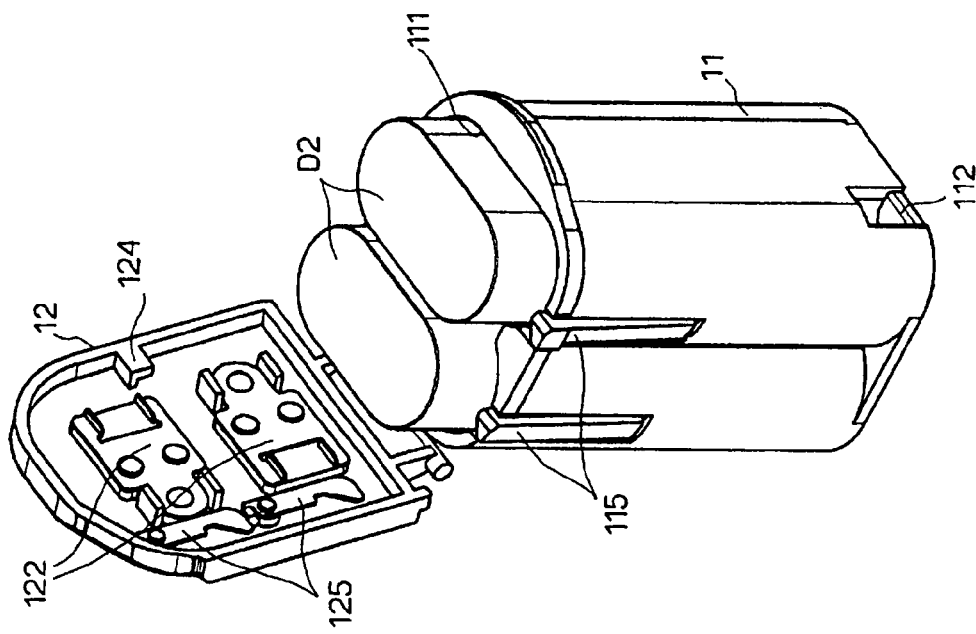

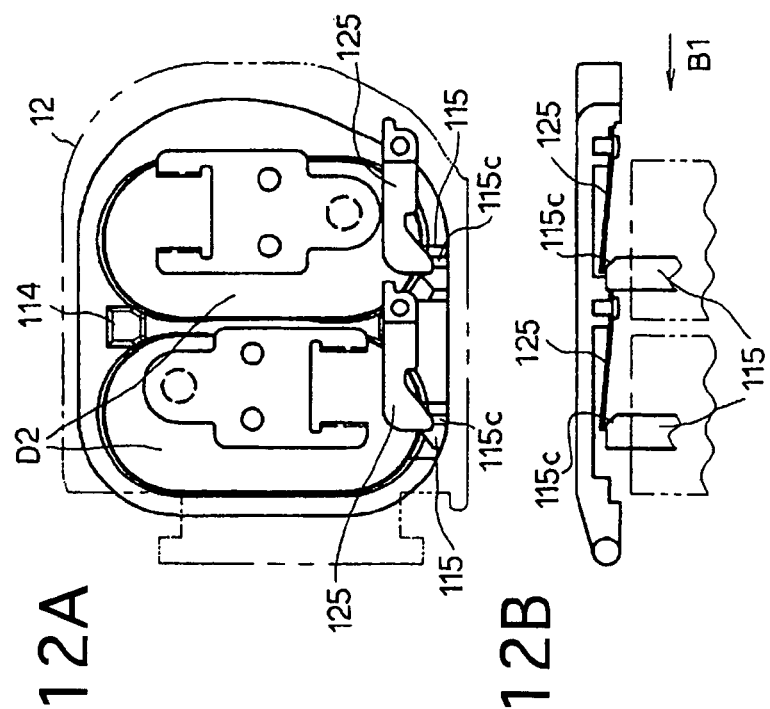
Fig. 11A
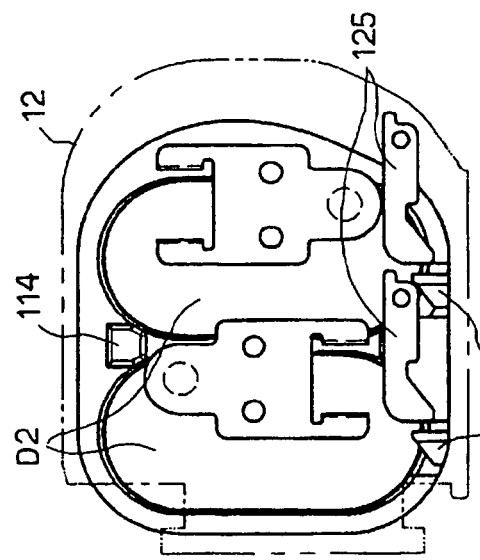
Fig. 12A
Fig. 11B
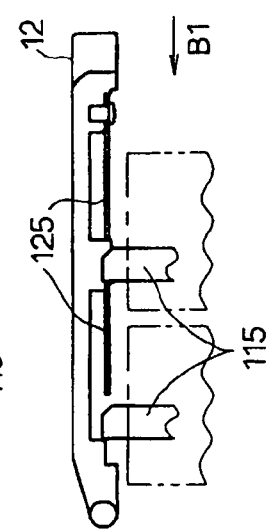
Fig. 12B

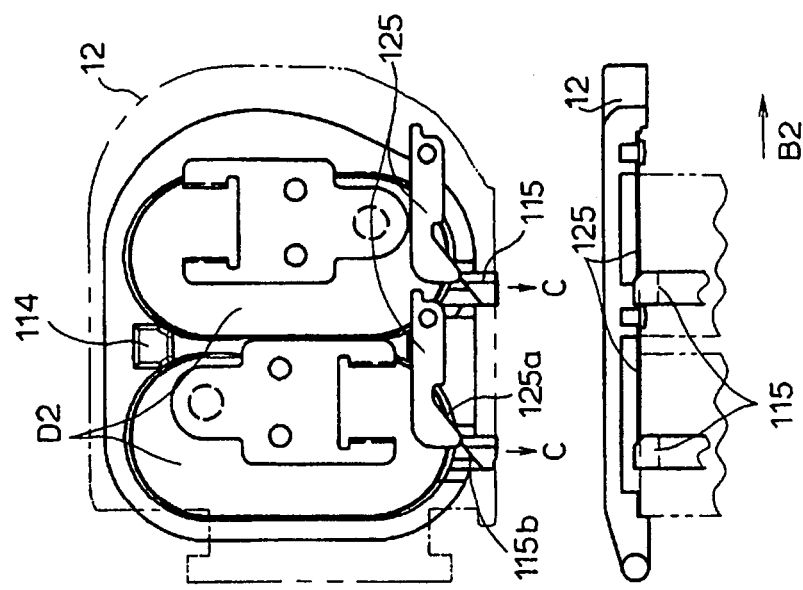
Fig. 13A
Fig. 13B
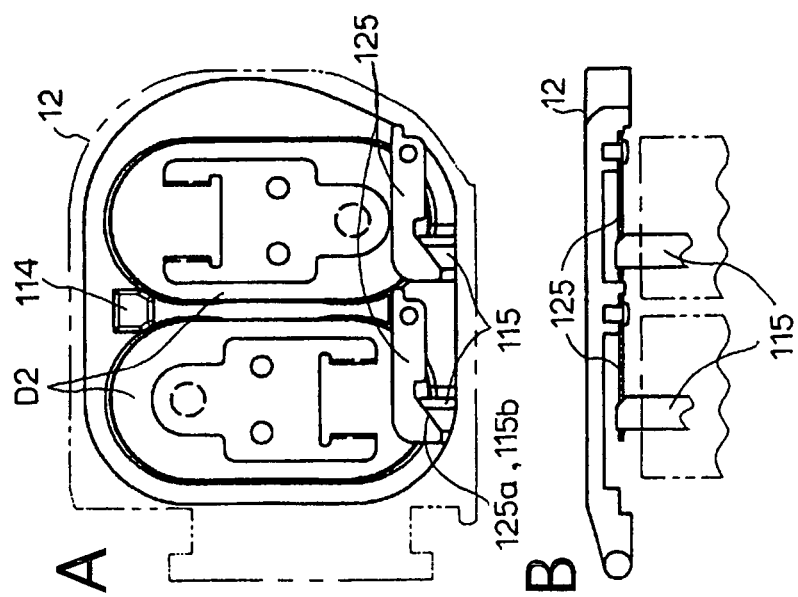
Fig. 14A
Fig. 14B

Fig. 15A
Fig. 15B
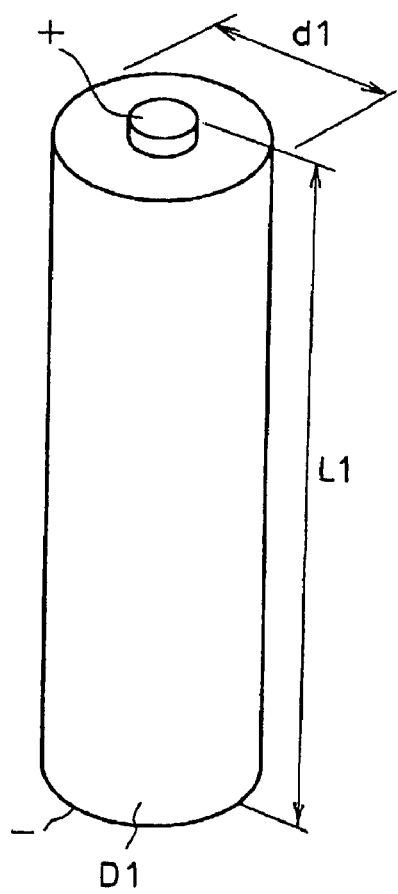
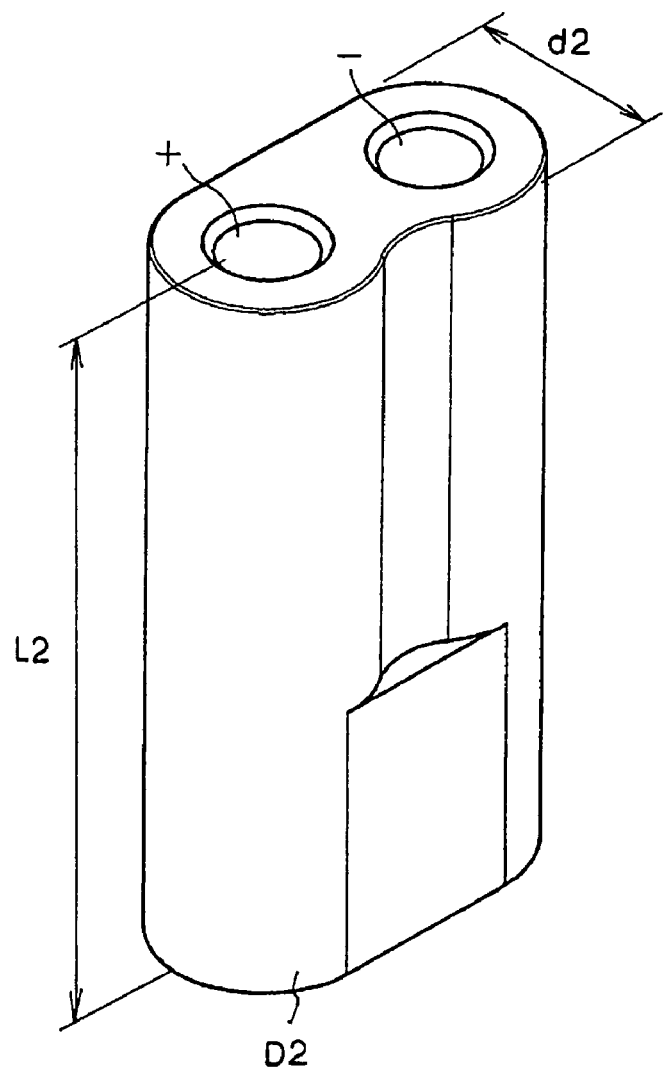

Fig. 16A
Fig. 16B
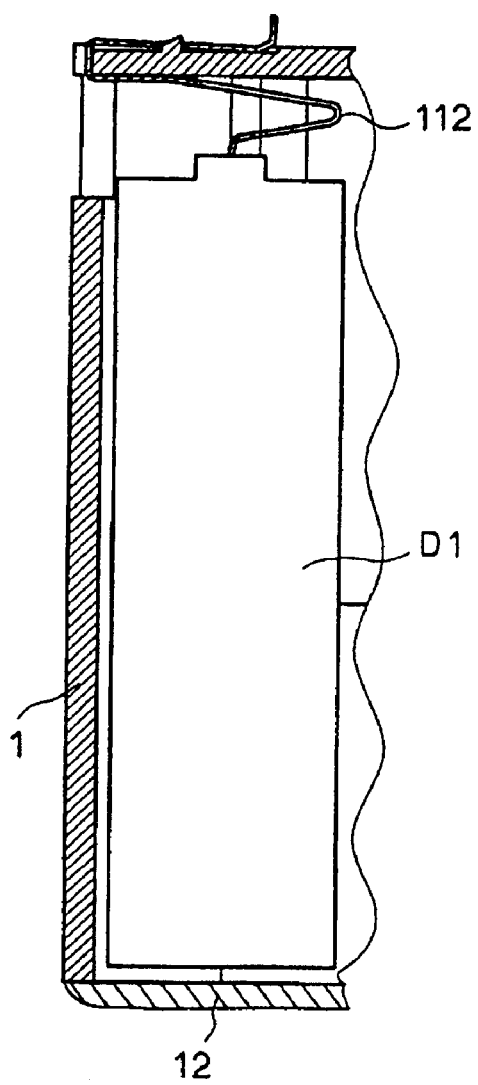
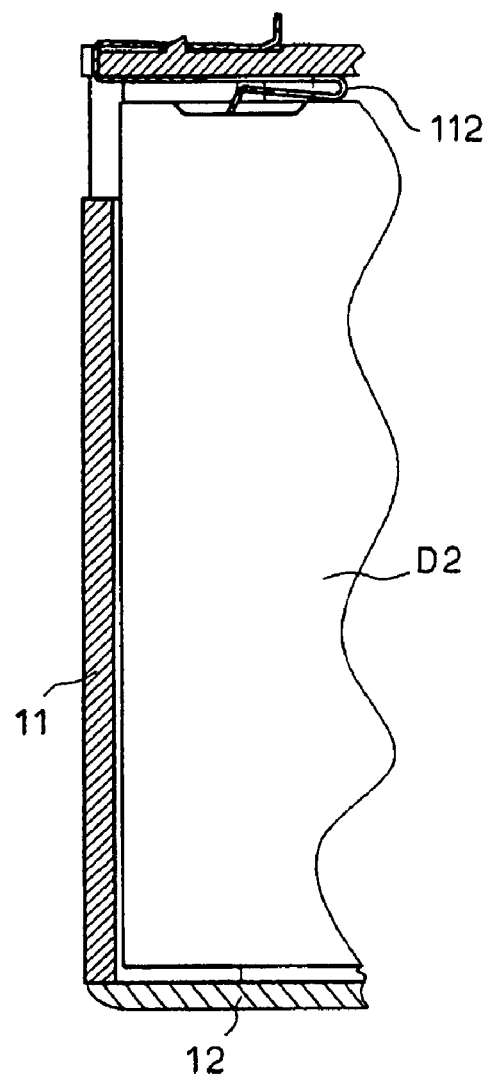

Fig. 39
Fig. 40
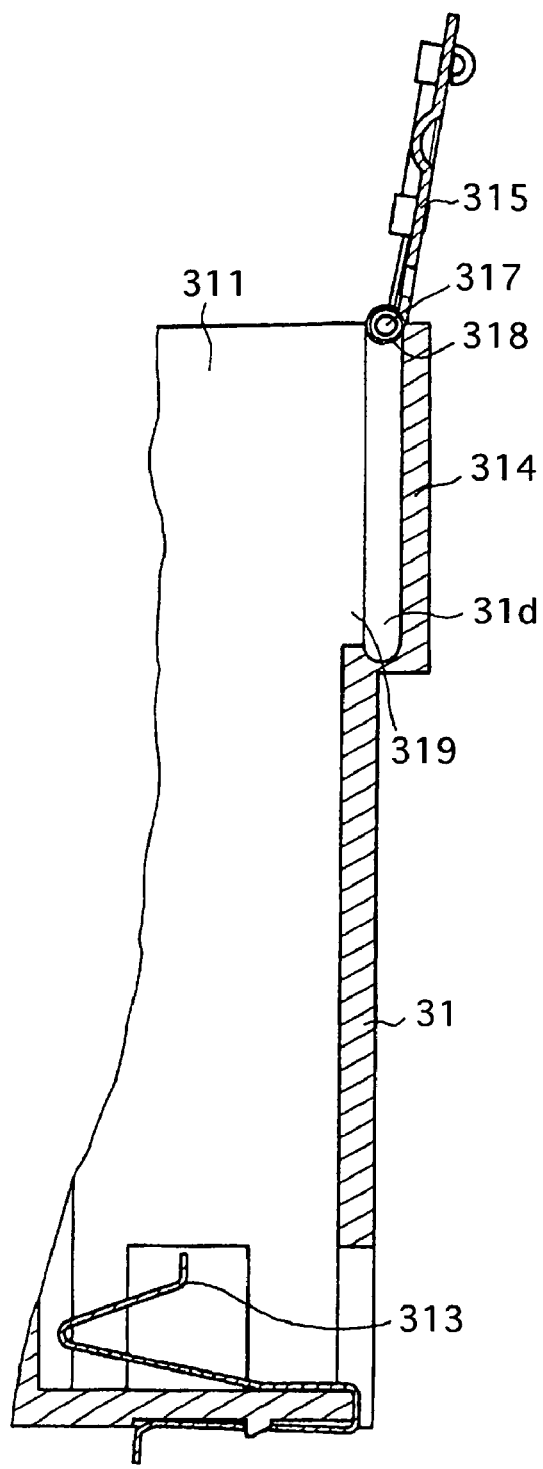
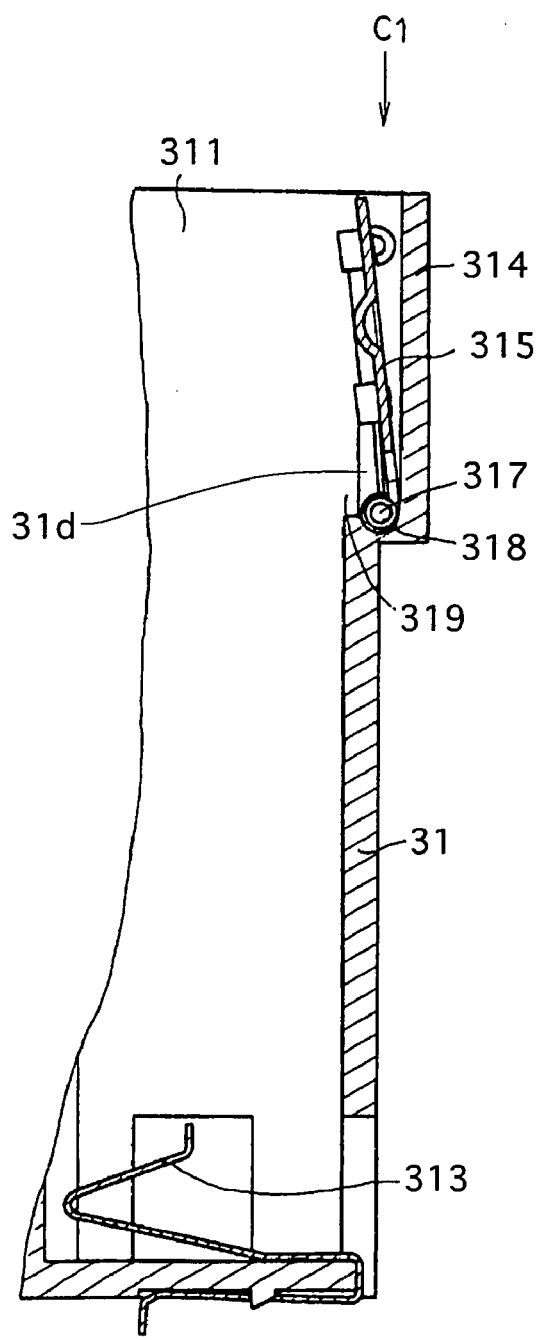

BATTERY CASE

BACKGROUND OF THE INVENTION

1. Field of the Invention

The present invention relates to a battery case of an electronic device in which different types of batteries having different shapes can be selectively used as a power source for the electronic device.

2. Description of the Related Art

Many electronic devices, especially cameras of recent years, have been designed to use a special battery exclusive thereto. For instance, lithium primary batteries are higher in weight energy density and volume energy density than lithium secondary batteries, and are accordingly, suitable as a power source especially for high-power consumption electronic devices such as digital cameras. However, since there are few manufacturers of lithium primary batteries developed specially for cameras, and since adequate sales outlets for such lithium primary batteries have not yet been established, it is hard to find the lithium primary batteries, especially in foreign countries, which causes inconvenience to the user when they use the camera. Consequently, various cameras have been made available to the market in recent years for which not only general-purpose primary lithium batteries and an exclusive secondary lithium battery but also general-purpose AA-sized cells that are easy to attain even in foreign countries, are available as a power source. For instance, in Japanese unexamined patent publication 2002-208387, a part of a camera body which surrounds a battery case (battery compartment) for accommodating an exclusive battery is constructed as a withdrawal battery-chamber forming member so that AA-sized cells can be accommodated in the battery case instead of the exclusive battery if the battery-chamber forming member is drawn out. This structure enables the camera to work on easy-to-get AA-sized cells.

A digital camera provided by the assignee of the present invention is also constructed to run on not only an exclusive battery (lithium primary battery) but also on AA-sized cells. FIG. 1 shows such a digital camera. As shown in FIG. 1, a camera body 1 is provided in a grip portion 3 thereof with a battery case 10 that forms a battery chamber. The battery case 10 includes a battery chamber lid 12 which is supported in hinged relationship to a bottom wall 1a of the camera body 1 so that the battery case 10 is closed and opened by closing and opening the battery chamber lid 12 when a battery is loaded and unloaded into and from the battery case 10. In a closed state of the battery chamber lid 12, sliding the battery chamber lid 12 slightly rearward in a direction shown by an arrow B1 in FIG. 1 relative to the camera body 1 causes the battery chamber lid 12 to be engaged with the bottom wall 1a to thereby be locked relative to the bottom wall 1a. In this digital camera, either four AA-sized cells or two CR-V3 batteries (lithium primary batteries) can be selectively accommodated in the battery case 10 since the digital camera is made to run by a six-volt power source. As shown in FIG. 15A, the AA-sized cell D1 is in the shape of a cylinder having a predetermined diameter d1 and a predetermined length L1 and is provided at upper and lower ends thereof with a positive electrode (+) and a negative electrode (−), respectively. On the other hand, the CR-V3 battery D2 has a shape corresponding to the shape of two AA-sized cells arranged side-by-side parallel to each other as shown in FIG. 15B, and accordingly, the thickness d2 of the CR-V3 battery D2 is substantially identical to the diameter d1 of the AA-sized cell D1. However, the length L2 of the CR-V3 battery D2 is greater than the length L1 of the AA-sized cell D1 (approximately 2.5 mm) and the CR-V3 battery D2 has a positive electrode (+) and a negative electrode (−) which are positioned side by side at an end surface of the CR-V3 battery D2.

To make the camera capable of selectively using four AA-sized cells or two CR-V3 batteries, the battery case 10 is shaped so that four AA-sized cells can be loaded into the battery case 10 in a two-by-two parallel arrangement and so that two CR-V3 batteries can be loaded into the battery case 10 with the two CR-V3 batteries arranged side-by-side in the direction of the thickness of the CR-V3 batteries. Additionally, although not shown in the drawings, springy metal contacts which are contactable with associated electrodes of the batteries accommodated in the battery case 10 are fixed to an inner surface of the battery chamber lid 12. The springy metal contacts are brought into contact with the associated electrodes of the batteries to establish electrical connections therebetween when the battery chamber lid 12 is closed.

In the above-described battery case that the assignee of the present invention has proposed, any member such as the aforementioned withdrawal battery-chamber forming member does not have to be drawn to the outside of the camera body, unlike the battery case shown in the aforementioned Japanese unexamined patent publication, which does not deteriorate not only the outward appearance of the camera but also the holding ease and the usability of the camera. However, since the difference in length (height) between the AA-sized cell and the CR-V3 battery is great, a problem arises in metal-to-metal contact between the aforementioned metal contacts on the battery chamber lid 12 and the associated electrodes of the battery when the battery chamber lid 12 is closed. FIGS. 16A and 16B show a cross sectional view of a part of the battery case 10 in which four AA-sized cells D1 are accommodated (only one of them appears in FIG. 16A) and a cross sectional view of a part of the battery case 10 in which two CR-V3 batteries are accommodated (only one of them appears in FIG. 16B), respectively, showing a comparison in a battery accommodated state therebetween. In the case where a resilient contact 112 is designed to have a spring force bringing the resilient contact 112 into proper contact with the positive electrode (+) of the associated relatively-short AA-sized cell D1 as shown in FIG. 16A, the degree of deformation of the resilient contact 112 becomes great when the relatively-long two CR-V3 batteries are used instead as shown in FIG. 16B to thereby cause the spring force exerted by the resilient contact 112 to become large. This large spring force (resiliency) of the resilient contact 112 acts on the battery chamber lid 12 at the bottom (upper end as viewed in FIG. 16B) of the associated CR-V3 battery, and accordingly, the battery chamber lid 12 needs to be closed by a relatively large force when closed, which makes it difficult to close the battery chamber lid 12. In addition, since the spring force of the resilient contact 112 remains exerted on the battery chamber lid 12 when it is held closed, it is also difficult to release the engagement of the battery chamber lid 12 with the bottom wall 1a of the camera body 1 to open the battery chamber lid 12 by sliding the battery chamber lid 12 relative to the bottom wall 1a of the camera body 1.

Conversely, if the resilient contact 112 is designed to be capable of producing only a small spring force, the negative electrode (bottom electrode as viewed in FIG. 16A) of the AA-sized cell D1 shown in FIG. 16A and the positive electrode (bottom electrode as viewed in FIG. 16A) of another AA-sized cell D1 (not shown in FIG. 16A) adjacent to the AA-sized cell D1 shown in FIG. 16A are not properly in contact with an associated contact (not shown) which is fixed to an inner surface of the battery chamber lid 12 to make these two AA-sized cells connected serially when the relatively-short AA-sized cells are loaded into the battery case.

SUMMARY OF THE INVENTION

The present invention provides a battery case which is constructed so that different types of batteries having different dimensions (length and shape) can be selectively accommodated in the battery case and so that such batteries can be easily accommodated and removed in and from the battery case.

The present invention also provides a battery case which is constructed so that different types of batteries having different dimensions (length and shape) can be selectively accommodated in the battery case while proper electrical connection is securely established and so that such batteries can be easily accommodated and removed in and from the battery case.

According to an aspect of the present invention, a battery case is provided, including a box portion forming a battery chamber in which at least one short-length battery and at least one long-length battery can be selectively accommodated along a lengthwise direction of the box portion through an insertion opening thereof; a battery chamber lid for closing the insertion opening; at least one battery locking lug which is engaged with the long-length battery to lock the long-length battery in the box portion upon the long-length battery being inserted into the box portion; and at least one lock releasing piece which disengages the battery locking lug from the long-length battery when the battery chamber lid is opened from a closed state thereof.

It is desirable for the battery case to include at least one first lid-locking lug formed on the box portion; and at least one second lid-locking lug formed on the battery chamber lid. The first lid-locking lug and the second lid-locking lug are engaged with each other by sliding the battery chamber lid in a first direction with the battery chamber lid being closed.

It is desirable for the first lid-locking lug and the second lid-locking lug to be disengaged from each other by sliding the battery chamber lid in a second direction opposite to the first direction.

It is desirable for the battery locking lug to include a resilient leaf portion formed by two slits formed on either side thereof on the box portion. The resilient leaf portion is in a non-deformed state when engaged with the long-length battery. The long-length battery is disengaged from the resilient leaf portion upon the resilient leaf portion being resiliently deformed.

It is desirable for the resilient leaf portion to include a first beveled surface which is engaged with the lock releasing piece to guide the lock releasing piece in a direction of preventing the resilient leaf portion from being resiliently deformed when the battery chamber lid is moved in the first direction; and a second beveled surface which is engaged with the lock releasing piece to resiliently deform the resilient leaf portion via the lock releasing piece when the battery chamber lid is moved in the second direction.

It is desirable for the lock releasing piece to be made of a resilient metal leaf which is resiliently deformable in a direction of the thickness thereof and includes a beveled surface which is formed at a end of the resilient metal leaf to be inclined to both the first direction and the second direction. The first beveled surface of the resilient leaf portion resiliently deforms the lock releasing piece in the direction of thickness thereof to prevent the lock releasing piece from interfering with the battery locking lug when the lock releasing piece is moved in the first direction. The second beveled surface of the resilient leaf portion comes in contact with the beveled surface of the lock releasing piece and deforms the battery locking lug when the lock releasing piece is moved in the second direction.

It is desirable for the at least one short-length battery to be four short-length batteries; for the at least one long-length battery to be two long-length batteries each having a width substantially double the width of each the short-length batteries and a length greater than the length of each the short-length batteries; for the at least one battery locking lug to be two battery locking lugs which are engaged with the two long-length batteries to lock the two long-length batteries in the box portion upon the two long-length batteries being inserted into the box portion, respectively; and for the at least one lock releasing piece to be two lock releasing pieces which disengage the two battery locking lugs from the two long-length batteries, respectively, when the battery chamber lid is opened from the closed state thereof.

It is desirable for the short-length battery to be an AA-sized cell, and for the long-length battery to be a CR-V3 battery.

It is desirable for the battery case to be incorporated in a grip portion of a camera body of the camera.

It is desirable for at least one contact which comes in contact with an electrode of the short-length battery to be fixed to an inner surface of the battery chamber lid when the battery chamber lid is closed with the short-length battery being accommodated in the box portion.

It is desirable for the contact and the lock releasing piece to be fixed to the inner surface of the battery chamber lid to be positioned adjacent to each other.

It is desirable for the lock releasing piece to be elongated in the first direction.

In an embodiment, a battery case is provided, including a box portion forming a battery chamber in which at least one first type of battery and at least one second type of battery which have different dimensions can be selectively accommodated in a predetermined insertion direction through an insertion opening of the box portion; a battery chamber lid for closing the insertion opening; at least one movable contact mounted to a bottom of the box portion to be capable of moving in substantially the insertion direction, an electrode of selected one of the first type of battery and the second type of battery which is accommodated in the box portion being in contact with the movable contact; and at least one battery detection lever installed at a predetermined position allowing the battery detection lever to come in contact with the second type of battery to be moved thereby out of the box portion only when the second type of battery is accommodated in the box portion. The battery detection lever is engaged with the movable contact to make the movable contact remain in the box portion when the first type of battery is accommodated in the box portion, and the engagement of the battery detection lever with the movable contact is released to allow the movable contact to move out of the box portion when the second type of battery is accommodated in the box portion.

It is desirable for the battery detection lever to be rotatably supported by the box portion so that one end of the battery detection lever is positioned in the box portion through an opening formed on a side wall of the box portion, and so that the other end of the battery detection lever is located at a preventive position so as to prevent the movable contact from moving out of the box portion. When the second type of battery is accommodated in the box portion, the one end of the battery detection lever comes in contact with a side surface of the second type of battery and is pressed thereby to move outwards from the box portion while the other end of the battery detection lever retracts from the preventive position.

It is desirable for the battery case to include a biasing device which biases the one end of the battery detection lever in a direction toward the inside of the box portion.

It is desirable for the movable contact to be rotatably supported by the bottom of the box portion. A free end of the movable contact is positioned inside of the box portion through an opening formed on the bottom of the box portion to be capable of being in contact with the electrode of the selected one of the first type of battery and the second type of battery that is accommodated in the box portion. Another end of the movable contact is positioned so as to face the other end of the battery detection lever outside of the box portion. The movable contact is prevented from moving out of the box portion by engagement of the other end of the movable contact with the another end of the battery detection lever.

It is desirable for the first type of battery to include an AA-sized cell, for the second type of battery includes a CR-V3 battery, and for the one end of the battery detection lever to not be in contact with the AA-sized cell accommodated in the box portion, and to be in contact with a side surface of the CR-V3 battery accommodated in the box portion to be moved outwards from the box portion.

It is desirable for the battery case to be incorporated in a grip portion of a camera body of the camera.

It is desirable for at least one contact to be fixed to an inner surface of the battery chamber lid, the contact coming in contact with an electrode of the first type of battery when the battery chamber lid is closed with the first type of battery being accommodated in the box portion.

It is desirable for the battery detection lever to be pivoted about a first pivot shaft supported by the box portion, the movable lever to be pivoted about a second pivot shaft supported by the box portion, wherein the first pivot shaft and the second pivot shaft are substantially parallel to each other.

It is desirable for the first type of battery to be smaller in length than the second type of battery.

In an embodiment, a battery case is provided, including a box portion forming a battery chamber in which at least one short-length battery and at least one long-length battery can be selectively accommodated along a lengthwise direction of the box portion through an insertion opening thereof, the box portion including at least one contact, installed in the bottom thereof, which comes in contact with one of the short-length battery and the long-length battery when the one of the short-length battery and the long-length battery is accommodated in the box portion; and at least one movable contact movable between a closed position in which the movable contact covers the insertion opening and an open position in which the movable contact uncovers the insertion opening. The movable contact is moved to the closed position when the short-length battery is accommodated in the box portion. The movable contact is accommodated in the box portion when the long-length battery is accommodated in the box portion.

It is desirable for the movable contact to be attached to an end of the box portion at the insertion opening to be rotatable substantially along the lengthwise direction of the box portion between an inner position in which the movable contact is accommodated in an accommodation recess formed on an inner surface of the box portion, and an outer position in which the movable contact is positioned outside of the box portion to uncover the insertion opening.

It is desirable for the battery case to include at least one spring which biases the movable contact in a direction to uncover the insertion opening.

It is desirable for the battery case to include a click device which holds the movable contact in the closed position.

It is desirable for the movable contact to be slidable along the lengthwise direction of the box portion to be accommodated in the accommodation recess.

It is desirable for the at least one movable contact to include a pair of movable contacts positioned on opposite sides of the insertion opening.

It is desirable for the short-length battery to be at least two AA-sized cells, and for the long-length battery to be a CR-V3 battery. The movable contact is made as a short-circuiting contact via which a positive electrode of one of the two AA-sized cells and a negative electrode of the other of the two AA-sized cells are electrically connected.

It is desirable for the movable contact to include a protuberance and a circular apertured portion which are contactable with the positive electrode and the negative electrode, respectively.

It is desirable for the pair of movable contacts to be pivoted on the box portion so that one of the pair of movable contacts opens in a clockwise direction and the other of the pair of movable contacts opens in an anticlockwise direction.

It is desirable for the pair of movable contacts to be pivoted about two pivot shafts supported on the box portion, and for the two pivot shafts to be substantially parallel to an axis of rotation of the battery chamber lid.

It is desirable for the click device to include a projection which projects from the movable contact, and a spring leaf fixed to the box portion.

It is desirable for the battery case to be incorporated in a grip portion of a camera body of the camera.

According to an aspect of the present invention, when the long-length battery is accommodated in the box portion, the long-length battery is locked by the battery locking lug that is formed on the box portion, which makes it possible to prevent the long-length battery from projecting out of the box portion due to, e.g., the spring force of a resilient contact. Accordingly, when the battery chamber lid is closed, the long-length battery does not need to be pressed into the box portion at the same time the battery chamber lid is closed, which makes it possible for the battery chamber lid to be closed lightly by a small force. Moreover, when the long-length battery is removed from the battery case, the battery chamber lid can be manually opened easily by a small force because the engagement of the battery locking lug with the long-length battery prevents the long-length battery from projecting out of the box portion. Furthermore, since the battery locking lug is disengaged from the long-length battery immediately before the battery chamber lid is widely opened and further since the long-length battery projects out of the box portion by, e.g., the spring force of a resilient contact upon opening of the battery chamber lid, the long-length battery which projects out of the box portion can be easily removed therefrom.

According to another aspect of the present invention, when the first type of battery (short-length battery) is accommodated in the box portion, an electrode of the first type of battery can be in proper contact with the movable contact by an appropriate resilient force produced by a resilient deformation of the movable contact even though the first type of battery is shorter than the second type of battery (long-length battery) because the battery detection lever makes the movable contact remain to enter in the box portion when the first type of battery is accommodated in the box portion. On the other hand, when the second type of battery is accommodated in the box portion, the battery detection lever allows the movable contact to move away from the inside of the box portion, thus allowing an end contact portion of the movable contact to move away from the inside of the box portion, which substantially reduces the spring force exerted by the movable contact to the second type of battery, which makes it possible for the second type of battery to be inserted deeply into the box portion. Accordingly, the second type of battery does not need to be pressed into the box portion at the same time the battery chamber lid is closed, which makes it possible for the battery chamber lid to be closed lightly by a small force. Moreover, when the second type of battery is removed from the battery case, the battery chamber lid can be manually opened easily by a small force.

According to another aspect of the present invention, the long-length battery can be loaded and unloaded properly. Specifically, the battery chamber lid can be opened and closed properly by a small force by designing the contact, which is installed to the bottom of the box portion, so that the contact comes in proper contact with an electrode of the long-length battery when the long-length battery is loaded into the battery case. On the other hand, when the short-length battery is loaded into the battery case, because the movable contact is positioned between the battery chamber lid and the short-length battery, the internal state of the battery case in which the short-length battery is accommodated becomes substantially the same as the internal state of the battery case in which the long-length battery is accommodated. This arrangement ensures a proper electrical contact between the contact and an electrode of the short-length battery while ensuring a proper electrical contact between the movable contact and another electrode of the short-length battery, and allows the battery chamber lid to be properly opened and closed by a small force in loading and unloading the short-length battery.

The present disclosure relates to subject matter contained in Japanese Patent Applications Nos. 2005-31318, 2005-31319 and 2005-31320 (all filed on Feb. 8, 2005) which are expressly incorporated herein by reference in their entireties.

BRIEF DESCRIPTION OF THE DRAWINGS

The present invention will be described below in detail with reference to the accompanying drawings in which:

FIG. 9 is a perspective view of the battery case shown in FIG. 2 in a state where two CR-V3 batteries are partially inserted into the battery case;

FIG. 10 is a perspective view of the battery case shown in FIG. 2 in a state where two CR-V3 batteries have been pressed into the battery case to be fully inserted therein to thereby be engaged with two battery locking lugs;

FIGS. 11A, 12A, 13A and 14A are plan views of the battery case for illustrating sliding operations of the battery chamber lid;

FIGS. 11B, 12B, 13B and 14B are cross sectional views of a portion of the battery case, which respectively correspond to those shown in FIGS. 11A, 12A, 13A and 14A, for illustrating sliding operations of the battery chamber lid;

FIGS. 15A and 15B are perspective views of an AA-sized cell and a CR-V3 battery, respectively, showing a comparison of the dimensions therebetween;

FIGS. 16A and 16B are longitudinal sectional views of a portion of a battery case of the prior art, with an AA-sized cell and a CR-V3 battery being accommodated in the battery case, respectively, showing the difference in the degree of deformation of a resilient contact fixed to the bottom of the battery case;

FIG. 39 is a longitudinal sectional view of a portion of a type of battery case in which each movable contact can be retracted into an accommodation recess by a sliding action of the movable contact, unlike the embodiment of the battery case shown in FIGS. 26 through 38; and FIG. 40 is a longitudinal sectional view of a portion of the battery case shown in FIG. 39 in a state where the movable contact is retracted into the accommodation recess.

DESCRIPTION OF THE PREFERRED EMBODIMENTS

Figure 1:
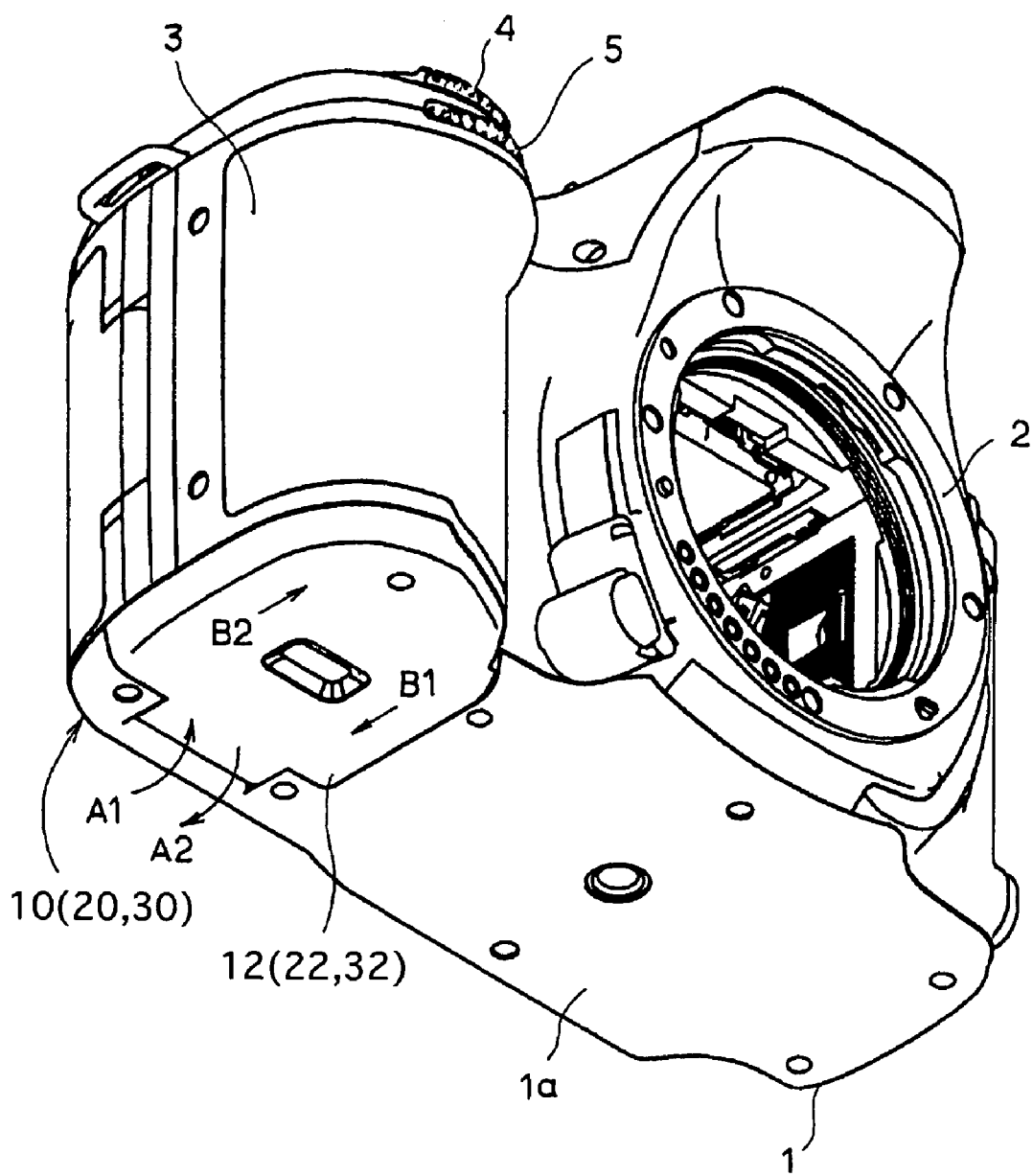
FIG. 1 is a perspective view of a camera body in which a battery case to which the present invention is applied is incorporated, viewed obliquely from below at the front thereof.

FIG. 1 is a perspective view of a camera body as an example of electronic equipment which incorporates a battery case to which the present invention is applied, viewed obliquely from below the camera body. The camera body 1 is that of an SLR type digital camera system. The camera body 1 is provided on a front surface thereof with a mount ring 2 to which an interchangeable photographing lens (not shown) can be detachably attached. The camera body 1 is provided, on a left side portion thereof as viewed from front of the camera body 1, with a grip portion 3, and is provided on top of the grip portion 3 with a release button (not shown), and is further provided on the grip portion 3 in the vicinity of the release button with a main switch 4 and a select dial 5 that partly appear in FIG. 1. The camera body 1 is provided inside of the grip portion 3 with a battery case 10 provided independently of the camera body 1. The camera body 1 is provided at the bottom of the grip portion 3 with a battery chamber lid 12 for opening and closing a bottom opening 111 of the battery case 10. The battery chamber lid 12 also serves as a portion of a bottom wall 1a of the camera body 1. When the bottom opening 111 of the battery case 10 is opened or closed by opening or closing the battery chamber lid 12, respectively, the battery chamber lid 12 is rotatable in a first rotation direction (closing direction) A1 and a second rotation direction (opening direction) A2 opposite to the first rotation direction (closing direction) A1 (see FIG. 1) and is further slidable in a first sliding direction (closing direction) B1 and a second sliding direction (opening direction) B2 opposite to the first sliding direction B1 (see FIG. 1).

Figure 2:
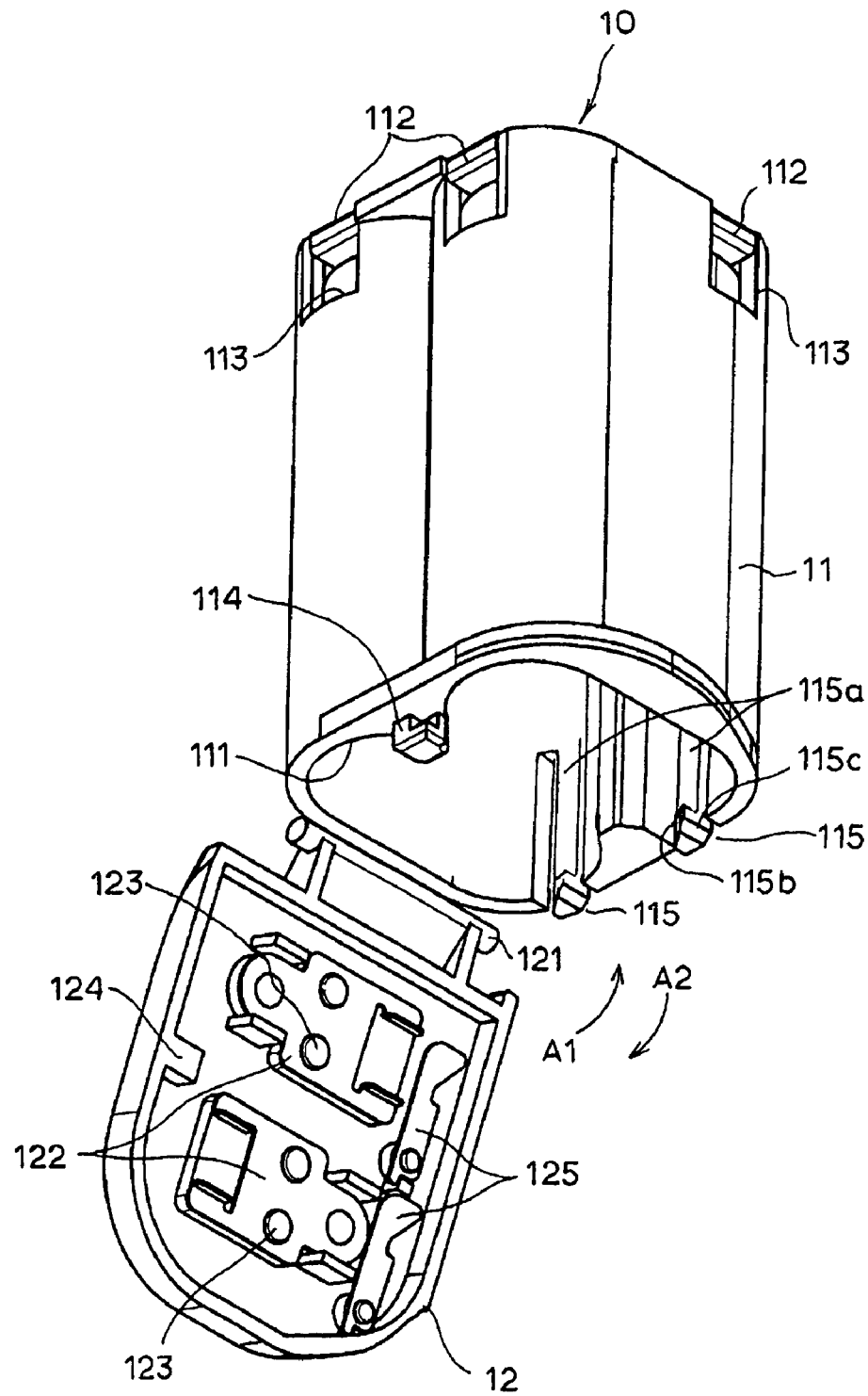
FIG. 2 is an exploded perspective view of a first embodiment of a battery case of the camera body shown in FIG. 1.

FIG. 2 is a perspective view of a first embodiment of the battery case in a state where the battery case 10 is removed from the camera body 1. The battery case 10 includes a box portion 11 and a battery chamber lid 12. The box portion 11, having a substantially hollow rectangular columnar shape forms a battery chamber is provided at the bottom thereof with the bottom opening 111 which is opened and closed by the battery chamber lid 12. Each of the box portion 11 and the battery chamber lid 12 is molded of resin. The shape and dimensions of the battery chamber formed inside of the battery case 10 are determined so that either four AA-sized cells (each designated by "D1"in the drawings) or two CR-V3 batteries (battery packs) (each designated by "D2" in the drawings) can be selectively accommodated in the battery case 10 with the four AA-sized cells D1 arranged in a two-by-two arrangement or with the two CR-V3 batteries D2 arranged in a side-by-side parallel arrangement, respectively. The battery chamber lid 12 is hinged on the bottom wall 1a of the camera body 1 along one side of the bottom opening 111 via a hinge 121. The battery chamber lid 12 is locked relative to the box portion 11 to become non-rotatable about the hinge 121 by sliding the battery chamber lid 12 in the first sliding direction B1 (see FIG. 1), which is parallel to the bottom wall 1a, after having rotated the battery chamber lid 12 in the first rotation direction A1 up to a position at which the bottom opening 111 is closed by the battery chamber lid 12. Conversely, the battery chamber lid 12 is disengaged from the box portion 11 to thereby be allowed to be opened in the second rotation direction A2 by sliding the battery chamber lid 12 in the second sliding direction B2 (opposite to the first sliding direction B1). Accordingly, the battery chamber lid 12 is loosely hinged on the bottom wall 1a via the hinge 121 to be slidable in the sliding directions B1 and B2 by a slight amount of movement.

Figure 3:
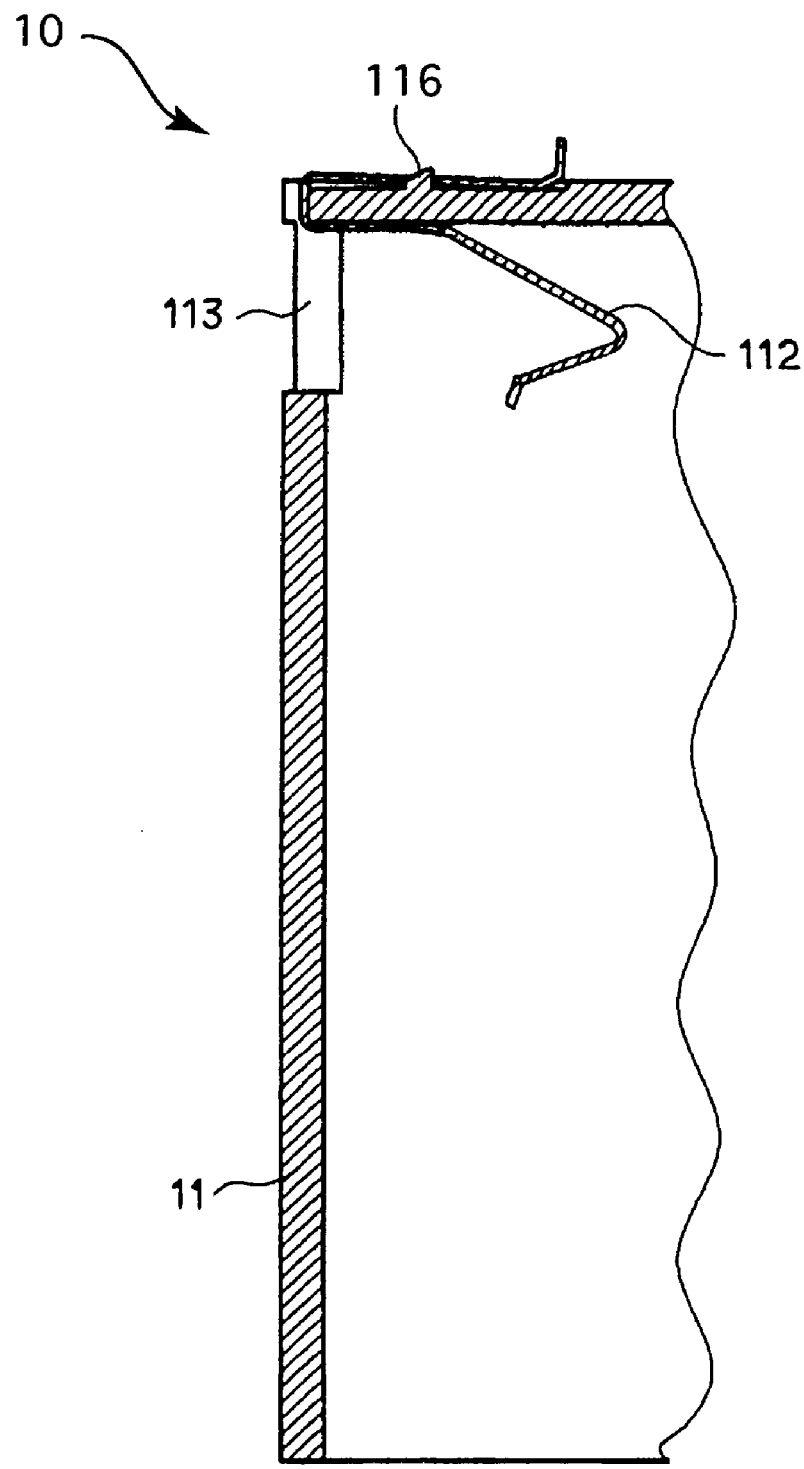
FIG. 3 is a longitudinal sectional view of a portion of the battery case shown in FIG. 2.

FIG. 3 is a longitudinal sectional view of a portion of the battery case 10. Four resilient contacts (resilient contact members) 112 (only one of them is shown in FIG. 3) are fixed to a top end wall of the box portion 11 to project into the inside (battery chamber) of the box portion 11 so as to come in contact with corresponding electrodes of the AA-sized cells D1 (see FIG. 15A) or the CD-V3 batteries D2 (see FIG. 15B) which are loaded into the box portion 11 to establish electrical connections. Each resilient contact 112 is made of a resilient metal leaf. The resilient portion (springy portion) having a substantially V-shaped cross section of each resilient contact 112 is inserted into the inside of the box portion 11 from the outside thereof through an associated through hole 113 formed on the box portion 11 along the top end wall thereof, while the remaining portion of the resilient contact 112 which is shaped like a clip is snapped onto the top end wall of the box portion 11 to be fixed thereto via an associated projection 116 which projects upwards from the top end wall of the box portion 11 as shown in FIG. 3. The resilient portion of each resilient contact 112 is bent so as to project downwards from the top end wall of the box portion 11 by a relatively large amount of projection to ensure an appropriate electrical contact with the associated AA-sized cell D1 that is relatively short (shorter than the CR-V3 battery D2). Due to this structure, the degree of deformation of each resilient contact 112 becomes greater when two CR-V3 batteries D2 that are longer than AA-sized cells D1 are accommodated in the battery case 10 (see FIGS. 16A and 16B).

Figure 4:
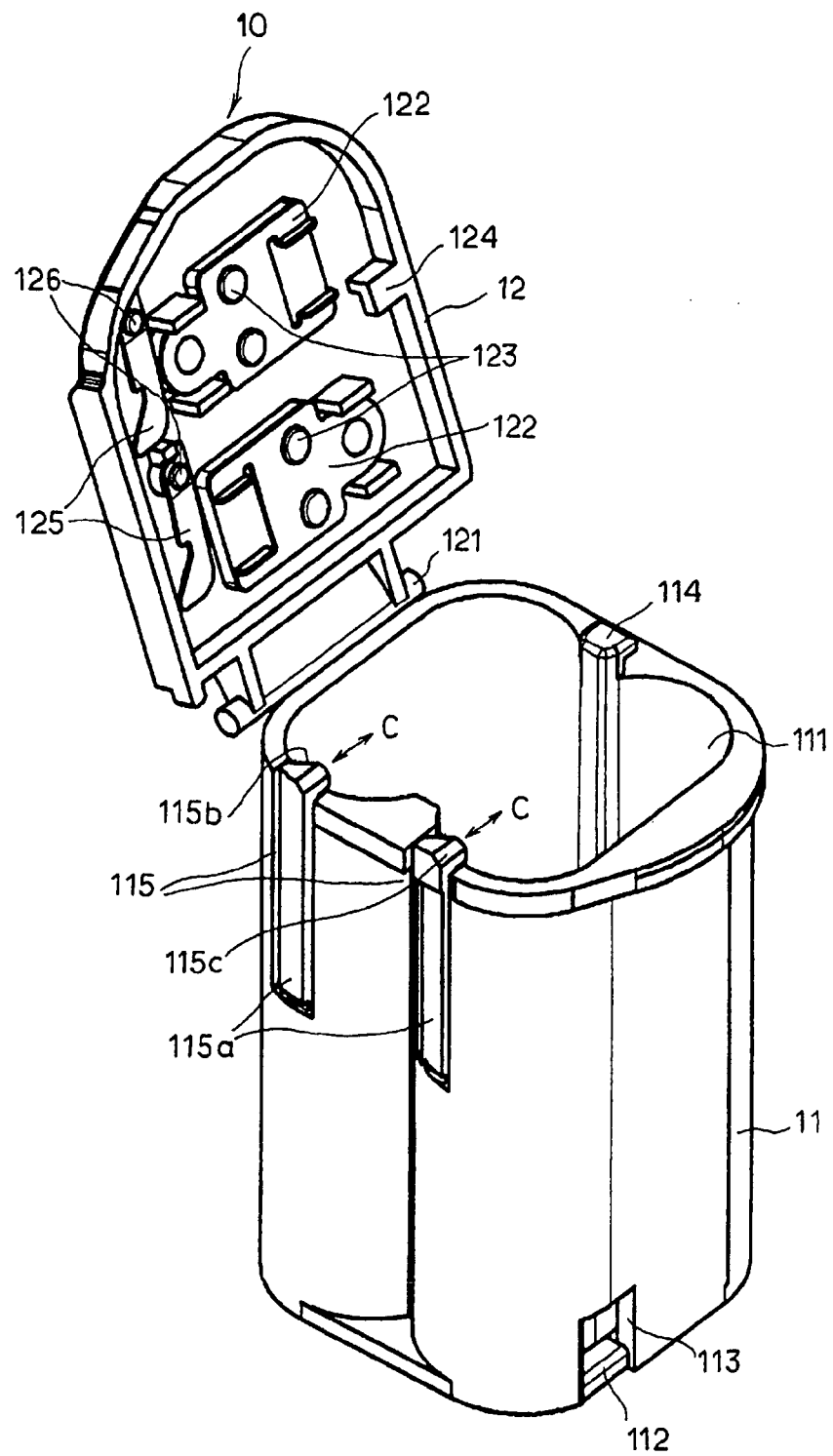
FIG. 4 is a perspective view of the battery case shown in FIG. 2, viewed from the bottom side thereof with the battery case positioned upside down.

FIG. 4 is a perspective view of the battery case 10 shown in FIG. 2, viewed from the bottom side thereof with the battery case 10 being positioned upside down.

Figure 5:
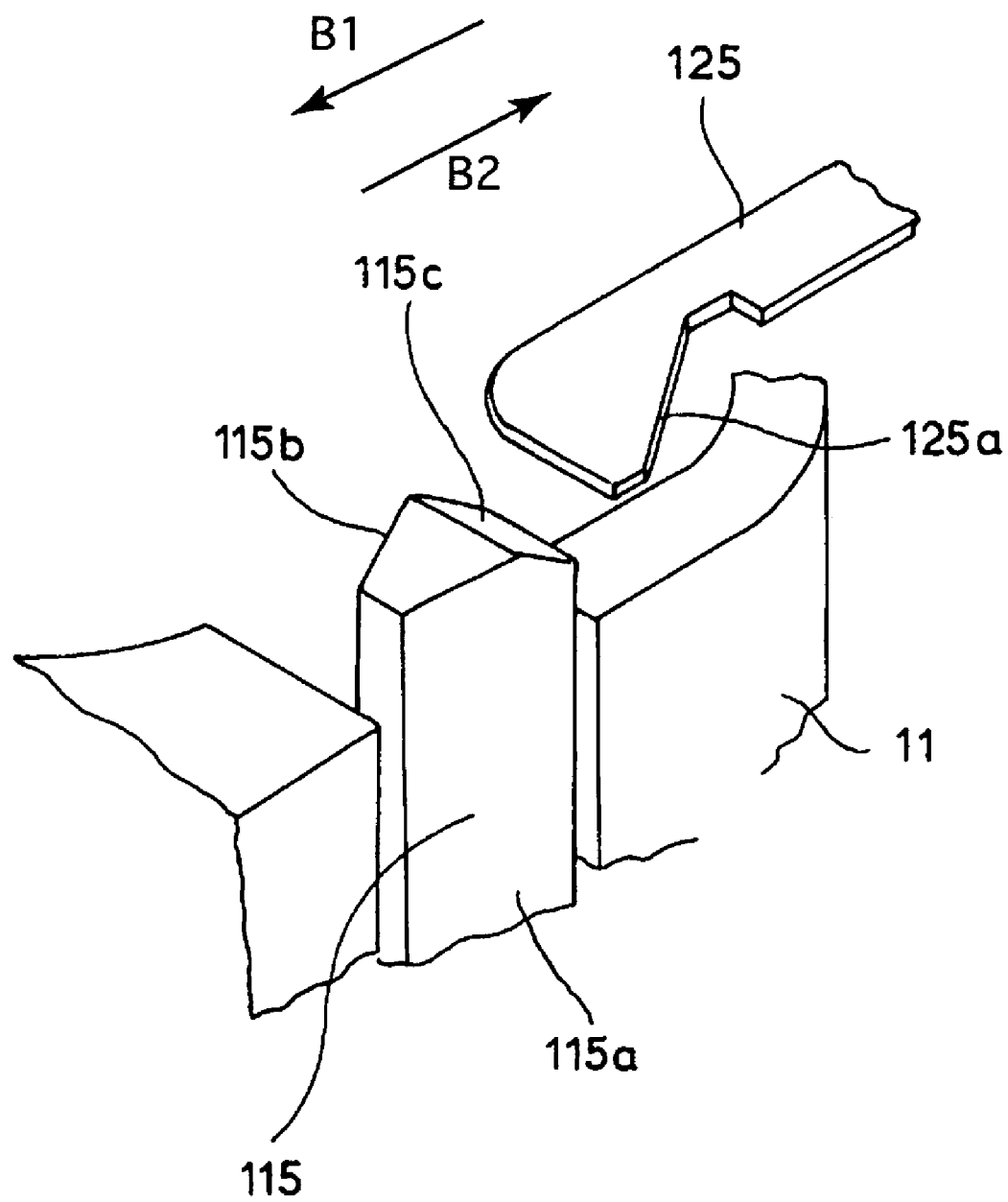
FIG. 5 is an enlarged perspective view of a portion of the battery case shown in FIG. 4.

As shown in FIG. 2, the box portion 11 is provided, on a bottom end surface of the box portion 11 at the bottom opening 111 on one side thereof, with a lid-locking lug 114 for locking the battery chamber lid 12, and is further provided on the opposite side of the box portion 11 with two battery locking lugs 115. The lid-locking lug 114 is formed integral with the bottom end surface of the box portion 11 at the bottom opening 111 to have an L-shape in cross section so that a locking groove is formed between the lid-locking lug 114 and the bottom end surface of the box portion 11. Each battery locking lug 115 is provided with a vertically-elongated resilient leaf portion 115a, which is resiliently deformable in the direction of the wall thickness of the box portion 11, is formed by two slits formed on either side thereof in a side wall of the box portion 11 in the vertical direction, so that the two battery locking lug 115 face side wall of the two CR-V3 battery D2 accommodated in the box portion 11, respectively. The bottom end (top end as viewed in FIG. 4) of the resilient leaf portion 115a of each battery locking lug 115 is bent inwards, toward the inside of the box portion 11, to be formed like a claw. As shown in FIG. 5, each battery locking lug 115 is provided, at the bottom end thereof (upper end as viewed in FIG. 5) on the claw-shaped portion of the battery locking lug 115, with a first beveled flat surface 115c and a second beveled flat surface 115b. The second beveled flat surface 115b is inclined in a direction perpendicular to the first and second sliding directions B1 and B2 of the battery chamber lid 12 as viewed from below the battery case 10, and the first beveled flat surface 115c that is adjacent to the second beveled flat surface 115b is inclined in a battery insertion direction of the battery case 10. This structure makes it possible for each battery locking lug 115 to be resiliently deformable in a lateral direction of the box portion 11 (shown by arrows C in FIG. 4) by deformation of each battery locking lug 115 in the direction of thickness thereof. Specifically, when two CR-V3 batteries D2 are loaded into the box portion 11, the two battery locking lugs 115 are resiliently deformed outwards in the lateral direction C to move away from the inside of the bottom opening 111 to thereby allow the two CR-V3 batteries D2 to be inserted into the box portion 11, while the two battery locking lugs 115 resiliently return to their original positions so that the claw-shaped portions at the free ends of the two battery locking lugs 115 are respectively engaged with the bottoms of the two CR-V3 batteries D2 to prevent the two CR-V3 batteries D2 from coming out of the box portion 11 upon the two CR-V3 batteries D2 being inserted all the way into the box portion 11.

On the other hand, two plate contacts 122 for short circuiting, which are made of metal, are fixed to an inner surface of the battery chamber lid 12. When four AA-sized cells D1 are accommodated in the box portion 11, each plate contact 122 comes in contact with adjacent electrodes (positive and negative electrodes) of the associated two of the four AA-sized cells D1 so that these two AA-sized cells D1 are connected in series. The battery chamber lid 12 is provided, on an inner surface thereof on one of laterally opposite sides of the two plate contacts 122 (on the left side as viewed in FIG. 2), with a lid-locking lug 124 having a substantially L-shape in cross section which is engaged with the lid-locking lug 114 when the battery chamber lid 12 is operated to slide in the first sliding direction B1 in the above described manner. Two lock releasing pieces 125 are fixed to an inner surface of the battery chamber lid 12 (on the right side as viewed in FIG. 2) to face the two plate contacts 122, respectively. Each lock releasing piece 125 is made of a resilient metal which is resiliently deformable in the direction of thickness of the resilient metal leaf. The two lock releasing pieces 125 are each fixed at one end thereof (lower ends as viewed in FIG. 2) to an inner surface of the battery chamber lid 12 by two set screws 126, respectively, to be aligned in the first sliding direction B1. In a state where the battery chamber lid 12 is closed, the two lock releasing pieces 125 are positioned at the same vertical position as the first beveled flat surfaces 115c of the two battery locking lugs 115, i.e., lie in a plane in which the first beveled flat surfaces 115c lie to face the first beveled flat surfaces 115c, respectively. Furthermore, each lock releasing piece 125 is provided at a end portion (free end portion) thereof with a beveled edge 125a (see FIG. 5) which is inclined to the sliding directions B1 and B2 so that the width of the lock releasing piece 125 increases in the direction from the fixed end to the free end of the lock releasing piece 125 in a state where the battery chamber lid 12 is closed. The angle of the beveled edge 125a of each lock releasing piece 125 and the angle of the second beveled flat surface 115b of the associated battery locking lug 115 are substantially the same.

Figure 7:
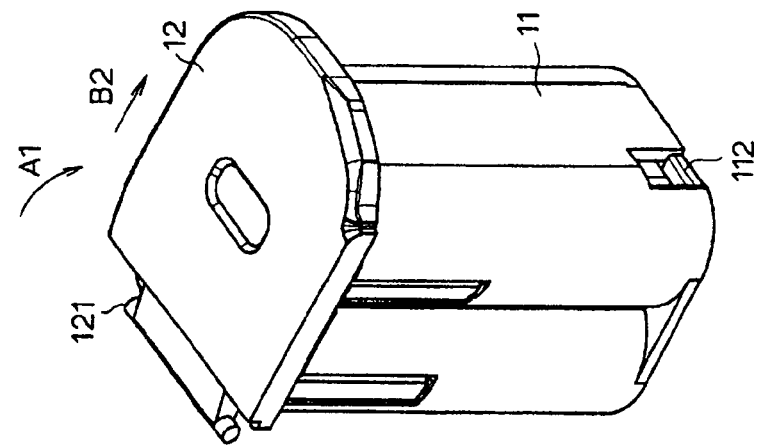
FIG. 7 is a perspective view of the battery case shown in FIG. 2 in a state where the battery chamber lid is closed with four AA-sized cells being accommodated in the battery case (though the battery chamber lid is not yet locked)
Figure 6:
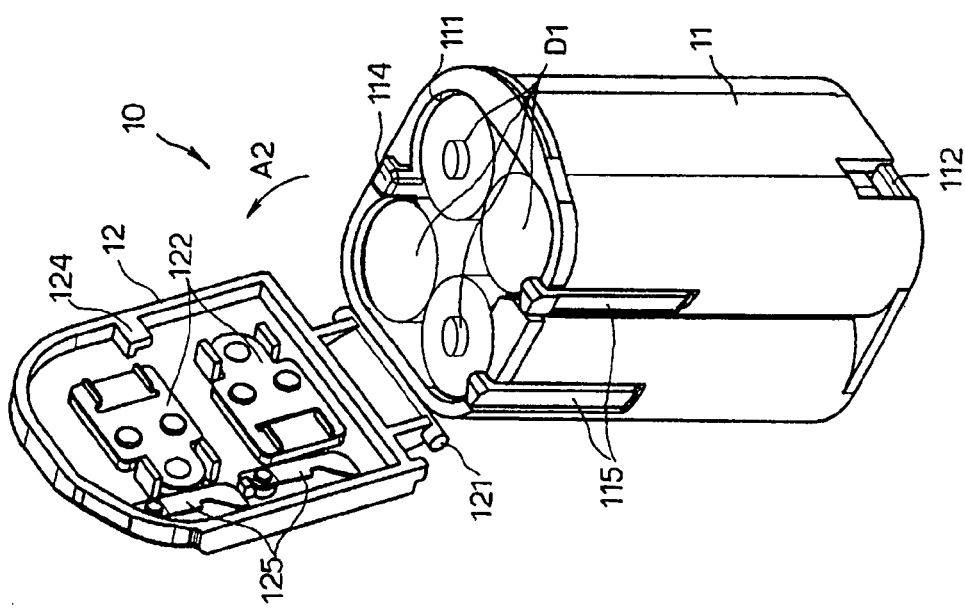
FIG. 6 is a perspective view of the battery case shown in FIG. 2 in a state where four AA-sized cells are accommodated.

The operating procedures for loading and unloading either four AA-sized cells D1 or two CR-V3 batteries D2 into and from the battery case 10 will be hereinafter discussed with reference to FIGS. 6 through 10. In these drawings, only the battery case 10 is shown in the case where either four AA-sized cells D1 or two CR-V3 batteries D2 are loaded into the battery case 10 with the battery case 10 turned upside down, so that the battery chamber lid 12 is positioned at the top. In the state where the battery chamber lid 12 is open as shown in FIG. 6, the bottom opening 111 of the box portion 11 is exposed, and therefore either four AA-sized cells D1 or two CR-V3 batteries D2 can be inserted into the box portion 11. In this state, in the case that four AA-sized cells D1 are inserted, bottom ends thereof (two positive-electrode side ends and two negative-electrode side ends), that appear in FIG. 6, are positioned slightly inwards (downwards as viewed in FIG. 6) from the bottom end surface of the box portion 11 at the bottom opening 11 because the AA-sized cell D1 is shorter than the CR-V3 battery D2, thus resiliently deforming each resilient contact 112 only by a small degree. Additionally, since the diameter of the AA-sized cell D1 is smaller than the thickness of the CR-V3 battery D2, neither of the two battery locking lugs 115 becomes an obstacle to the loading of four AA-sized cells D1 into the box portion 11. Therefore, the spring force exerted by the four resilient contacts 112 on the battery chamber lid 12 via the accommodated four AA-sized cells D1 when the battery chamber lid 12 is closed in the first rotation direction A1 about the axis of the hinge 121, as shown in FIG. 7, is small. If the battery chamber lid 12 is operated to slide in the first sliding direction B1 (see FIG. 8) from the state shown in FIG. 7, the lid-locking lug 124 of the battery chamber lid 12 slides into the aforementioned locking groove between the lid-locking lug 114 and the bottom end surface of the box portion 11 to be engaged with the lid-locking lug 114 so that the closed state of the battery chamber lid 12 is maintained though the sliding engagement of the lid-locking lug 124 into the aforementioned locking groove.

Conversely, when four AA-sized cells D1 are removed out of the battery case 10, the lid-locking lug 124 is disengaged from the locking groove between the lid-locking lug 114 and the bottom end surface of the box portion 11 by sliding the battery chamber lid 12 in the second sliding direction B2 as shown in FIG. 7, and then the battery chamber lid 12 is opened by rotating the battery chamber lid 12 in the second rotation direction A2 as shown in FIG. 6. Thereupon, the four AA-sized cells D1 accommodated in the box portion 11 can be removed therefrom after the bottom opening 111 is widely opened as shown in FIG. 6.

Figure 8:
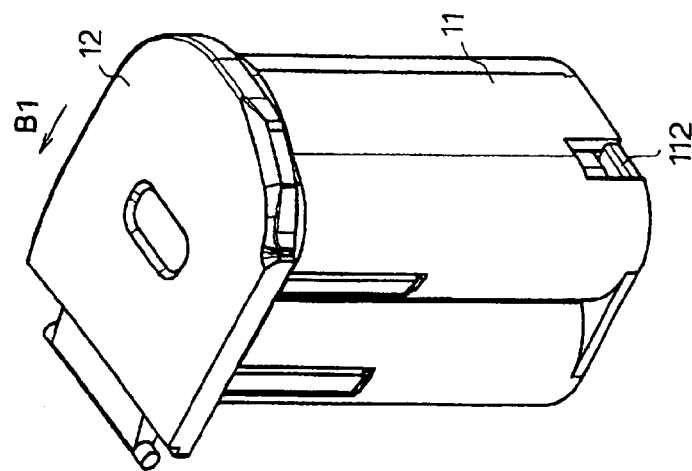
FIG. 8 is a perspective view of the battery case shown in FIG. 2 in a state where the battery chamber lid is closed with four AA-sized cells being accommodated in the battery case, wherein the battery chamber lid has been locked by a sliding movement of the battery chamber lid in a predetermined sliding direction relative to a bottom wall of the camera body.

On the other hand, in the case where two CR-V3 batteries D2 are loaded into the battery case 10, the bottom of each CR-V3 battery D2 projects out of the bottom opening 111 as shown in FIG. 9 due to the spring force of the associated resilient contact 112 if the two CR-V3 batteries D2 are simply put into the box portion 11 from the bottom opening 111. Therefore, if one wants to close the battery chamber lid 12 in the state shown in FIG. 9, the two CR-V3 batteries D2 need to be pressed into the box portion 11 at the same time against the spring force of the four resilient contacts 112. However, pressing the two CR-V3 batteries D2 into the box portion 11 causes the degree of deformation of each resilient contact 112 to increase, which makes the battery chamber lid 12 difficult to close. At time of inserting the two CR-V3 batteries D2 into the box portion 11, each battery locking lug 115 is resiliently deformed outwards by an outer peripheral surface of the associated CR-V3 D2 that is in pressing contact with the end (claw portion) of the battery locking lug 115 as shown in FIG. 9. However, upon each CR-V3 battery D2 being fully inserted into the box portion 11, the end of each battery locking lug 115 moves over the bottom of the associated CR-V3 battery D2 to move back inwards to thereby be engaged with the bottom of the associated CR-V3 battery D2 by the resiliency of the battery locking lug 115 as shown in FIG. 10. Due to the engagement of the ends (claw-shaped portions) of the two battery locking lugs 115 with the bottoms of the two CR-V3 batteries D2, respectively, the bottoms of the two CR-V3 batteries D2 remain to be fully accommodated in the box portion 11, and accordingly, the battery chamber lid 12 can be easily closed, just like the case where four AA-sized cells are accommodated in the box portion 11. In other words, when the two CR-V3 batteries D2 are loaded into the battery case 10, the two CR-V3 batteries D2 only need to be inserted deeply into the box portion 11 so that the two battery locking lugs 115 are respectively engaged with the bottoms of the two CR-V3 batteries D2 before closing the battery chamber lid 12. Thereafter, as shown in FIGS. 7 and 8, the closed state of the battery chamber lid 12 can be maintained by sliding the battery chamber lid 12 in the first sliding direction B1 to bring the lid-locking lug 124 of the battery chamber lid 12 to be engaged with the lid-locking lug 114, similar to the case where the battery chamber lid 12 is closed with four AA-sized cells being accommodated in the box portion 11. Accordingly, even when the battery chamber lid 12 is closed with two CR-V3 D2 being accommodated in the box portion 11, the battery chamber lid 12 can be operated to slide by a small force without interfering with either of the two CR-V3 batteries D2 accommodated in the box portion 11.

Operations of each battery locking lug 115 and each lock releasing piece 125 when the battery chamber lid 12 is operated to slide on the bottom surface of the box portion 11 will be hereinafter discussed with reference to FIGS. 11A through 14B. FIGS. 11A, 12A, 13A and 14A are diagrammatic plan views of the battery case 10, and FIGS. 11B, 12B, 13B and 14B are diagrammatic cross sectional views of a portion of the battery case 10. Firstly, at the time the battery chamber lid 12 is simply rotated all the way in the first rotation direction A1 after either four AA-sized cells D1 or two CR-V3 batteries D2 are loaded into the battery case 10, the two lock releasing pieces 125, which are fixed to an inner surface of the battery chamber lid 12, are at a position where the ends (left end as viewed in FIGS. 11A and 11B) of the lock releasing pieces 125 are positioned off the associated battery locking lug 115 on one of the opposite sides thereof in the second sliding direction B2 that is opposite to the first sliding direction B1 as shown in FIGS. 11A and 11B. Subsequently, sliding the battery chamber lid 12 in the first sliding direction B1 to bring the lid-locking lug 124 to be engaged with the lid-locking lug 114 causes the end of each lock releasing piece 125 to come into contact with the first beveled flat surface 115c of the associated battery locking lug 115, and further sliding the battery chamber lid 12 in the same direction causes each lock releasing piece 125 to be resiliently deformed in the direction of thickness thereof (upwards as viewed in FIG. 11B) while the end of the lock releasing piece 125 is sliding on the first beveled flat surface 115c of the associated battery locking lug 115 as shown in FIGS. 12A and 12B. Further sliding the battery chamber lid 12 in the same direction (the first sliding direction B1) causes the lid-locking lug 124 to be engaged with the lid-locking lug 114 and simultaneously causes the end of each lock releasing piece 125 to move across the end of the associated battery locking lug 115, so that each lock releasing piece 125 resiliently returns to its original shape. Thereupon, the beveled edge 125a of each lock releasing piece 125 is engaged with the second beveled flat surface 115b of the associated battery locking lug 115 as shown in FIGS. 13A and 13B.

When the battery chamber lid 12 is opened to remove the two CR-V3 batteries D2 from the battery case 10, sliding the battery chamber lid 12 in the second sliding direction B2 causes the beveled edge 125a of each lock releasing piece 125 to slide on the second beveled flat surface 115b of the associated battery locking lug 115 while remaining in contact therewith as shown in FIG. 14A and 14B, thus causing each battery locking lug 115 to be resiliently deformed outwards (in a direction shown by arrows C shown in FIG. 14A) due to the bevel engagement between the beveled edge 125a of each lock releasing piece 125 and the second beveled flat surface 115b of the associated battery locking lug 115. This deformation of each battery locking lug 115 brings the end thereof to retreat outwards from the inner edge of the bottom opening 111 of the box portion 11 to thereby be disengaged from the bottom of the associated CR-V3 battery D2. Upon this disengagement, each CR-V3 battery D2 is popped out of the box portion 11 to a degree by the spring force of the associated resilient contact 112 to be positioned as shown in FIG. 9. Therefore, if the battery chamber lid 12 is only widely opened in the second rotation direction A2 about the hinge 121 after having been slid in the second sliding direction B2, the two CR-V3 batteries D2 accommodated in the box portion 11 can be easily removed therefrom.

In this manner, when accommodated in the box portion 10, the two CR-V3 batteries D2 are respectively locked by the two battery locking lugs 115 that are formed on the box portion 11, which makes it possible to prevent each CR-V3 battery D2 from projecting out of the box portion 11 due to the spring force of the associated resilient contact 112. Accordingly, when the battery chamber lid 12 is closed, the two CR-V3 batteries D2 do not need to be pressed into the box portion 11 against the spring force of the four resilient contacts 112 at the same time the battery chamber lid 12 is closed, which makes it possible for the battery chamber lid 12 to be closed lightly by a small force. Moreover, although the battery chamber lid 12 is operated to slide in the second sliding direction B2 when the two CR-V3 batteries D2 are removed from the battery case 10, the battery chamber lid 12 can be easily operated to slide in the second sliding direction B2 by a small force because each CR-V3 battery D2 remains prevented from projecting out of the box portion 11 by the engagement of the associated battery locking lug 115 with the CR-V3 battery D2 during the sliding operation of the battery chamber lid 12 in the second sliding direction B2. Thereafter, immediately after the lid-locking lug 124 and the lid-locking lug 114 are disengaged from each other upon completion of the sliding operation of the battery chamber lid 12 in the second sliding direction B2, the engagement of each CR-V3 battery D2 with the associated battery locking lug 115 is released by the associated lock releasing piece 125, and accordingly, each CR-V3 battery D2 projects out of the box portion 11 due to the spring force of the associated resilient contact 112 upon opening of the battery chamber lid 12. Thereupon, the two CR-V3 batteries D2 accommodated in the box portion 11 can be removed therefrom after the bottom opening 111 is widely opened as shown in FIG. 9, without manually disengaging the two battery locking lugs 115 from the bottoms of the two CR-V3 batteries D2, respectively.

Unlike this illustrated embodiment, assuming that the battery case 10 does not have the two lock releasing pieces 125 on the battery chamber lid 12, the two battery locking lugs 115 which are engaged with the two CR-V3 batteries D2 will need to be manually disengaged from the two CR-V3 batteries D2, respectively, one at a time, after the battery chamber lid 12 is opened, which complicates the battery removing operation. Specifically, when the two CR-V3 batteries D2 accommodated in the battery case 10 are removed therefrom, it is necessary for the user to not only slide the battery chamber lid 12 but also to disengage the two battery locking lugs 115 from the two CR-V3 batteries D2 one by one. This disengaging operation is performed with one's fingertips and thus tends to be troublesome, which tends to complicate the battery removing operation on the whole. However, such a troublesome disengaging operation does not have to be carried out in the illustrated embodiment of the battery case; the two CR-V3 batteries D2 can be removed simply by sliding the battery chamber lid 12.

A second embodiment of the battery case will be hereinafter discussed with reference to FIGS. 17 through 25. Similar to the first embodiment of the battery case 10, the second embodiment of the battery case 20 is positioned inside of the grip portion 3 shown in FIG. 1.

Figure 17:
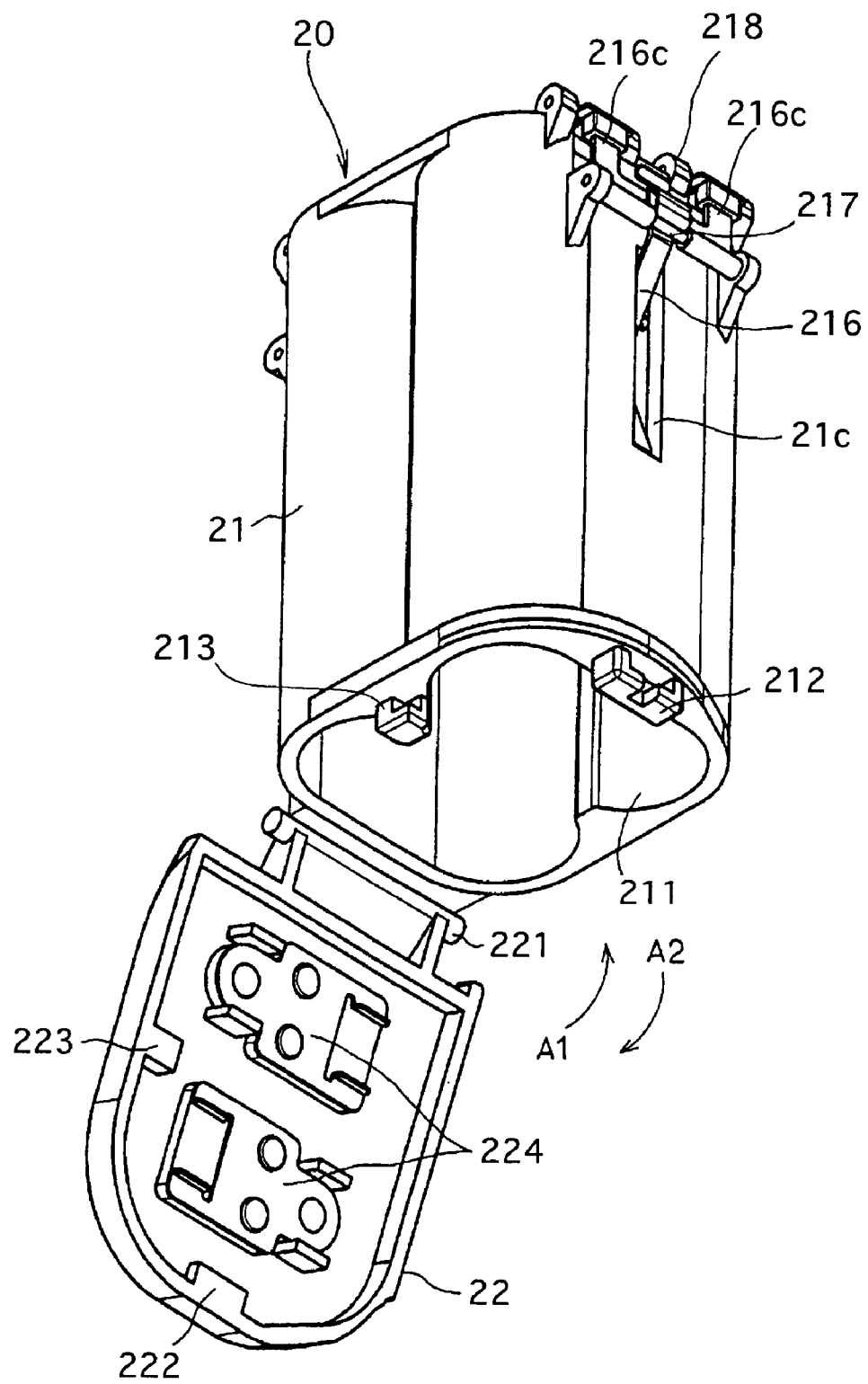
FIG. 17 is an exploded perspective view of a second embodiment of the battery case of the camera body shown in FIG. 1.

FIG. 17 is a perspective view of the battery case 20 in a state where the battery case 20 is removed from the camera body 1. The battery case 20 includes a box portion 21 and a battery chamber lid 22. The box portion 21 having a substantially hollow rectangular columnar shape and forming a battery chamber is provided at the bottom thereof with a bottom opening 211 which is opened and closed by the battery chamber lid 22. Each of the box portion 21 and the battery chamber lid 22 is molded of resin. The shape and dimensions of the battery chamber formed inside of the battery case 20 are determined so that either four AA-sized cells D1 or two CR-V3 batteries D2 can be accommodated in the battery case 20 with the four AA-sized cells D1 arranged in a two-by-two arrangement or with the two CR-V3 batteries D2 arranged in a side-by-side parallel arrangement, respectively. The battery chamber lid 22 is hinged on the bottom wall 1a of the camera body 1 along one side of the bottom opening 211 via a hinge 221. The box portion 21 is provided, on a bottom end surface thereof at the bottom opening 211 at the front thereof, with a first lid-locking lug 212 which projects downwards, and is further provided, on the bottom end surface of the box portion 21 on one side thereof along the first sliding direction B1, with a second lid-locking lug 213 which projects downwards. The first and second lid-locking lugs 212 and 213 are formed integrally with the bottom end surface of the box portion 21 at the bottom opening 211. As shown in FIG. 17, the first lid-locking lug 212, formed at the bottom front of the box portion 21, is formed so that a locking groove is formed between the first lid-locking lug 212 and the bottom end surface of the box portion 21, while the second lid-locking lug 213 is formed to have an L-shape in cross section so that another locking groove is formed between the second lid-locking lug 213 and the bottom end surface of the box portion 21.

On the other hand, the battery chamber lid 22 is provided, on an inner surface thereof at two points facing the first lid-locking lug 212 and the second lid-locking lug 213 in a closed state of the battery chamber lid 22, with a first lid-locking lug 222 and a second lid-locking lug 223 which are engaged with the first lid-locking lug 212 and the second lid-locking lug 213, respectively, when the battery chamber lid 22 is operated to slide in the first sliding direction B1. Each of the first lid-locking lug 222 and the second lid-locking lug 223 projects to have a substantially L-shape in cross section to be engageable with the first lid-locking lug 212 and the second lid-locking lug 213, respectively. Therefore, the first lid-locking lug 222 and the second lid-locking lug 223 are respectively engaged with the first lid-locking lug 212 and the second lid-locking lug 213 to lock the battery chamber lid 22 relative to the box portion 21 by sliding the battery chamber lid 22 in the first sliding direction B1 (see FIG. 1), which is parallel to the bottom wall 1a of the camera body 1, after having rotated the battery chamber lid 22 in the first rotation direction A1 up to a point at which the bottom opening 211 is closed by the battery chamber lid 22. Conversely, the first lid-locking lug 222 and the second lid-locking lug 223 are disengaged from the first lid-locking lug 212 and the second lid-locking lug 213, respectively, by sliding the battery chamber lid 22 in the second sliding direction B2 (opposite to the first sliding direction B1) shown in FIG. 1. Upon this disengagement, the battery chamber lid 22 is allowed to be opened in the second rotation direction A2 via the hinge 221. The battery chamber lid 22 is loosely hinged on the bottom wall 1a via the hinge 221 to be slidable in the sliding directions B1 and B2 by a slight amount of movement. Two plate contacts 224 for short circuit which are made of metal are fixed to an inner surface of the battery chamber lid 22. When four AA-sized cells D1 are accommodated in the box portion 11, each plate contact 224 comes in contact with adjacent electrodes (positive and negative electrodes) of the associated two of the four AA-sized cells D1 so that these two AA-sized cells D1 are connected in series.

Figure 18:
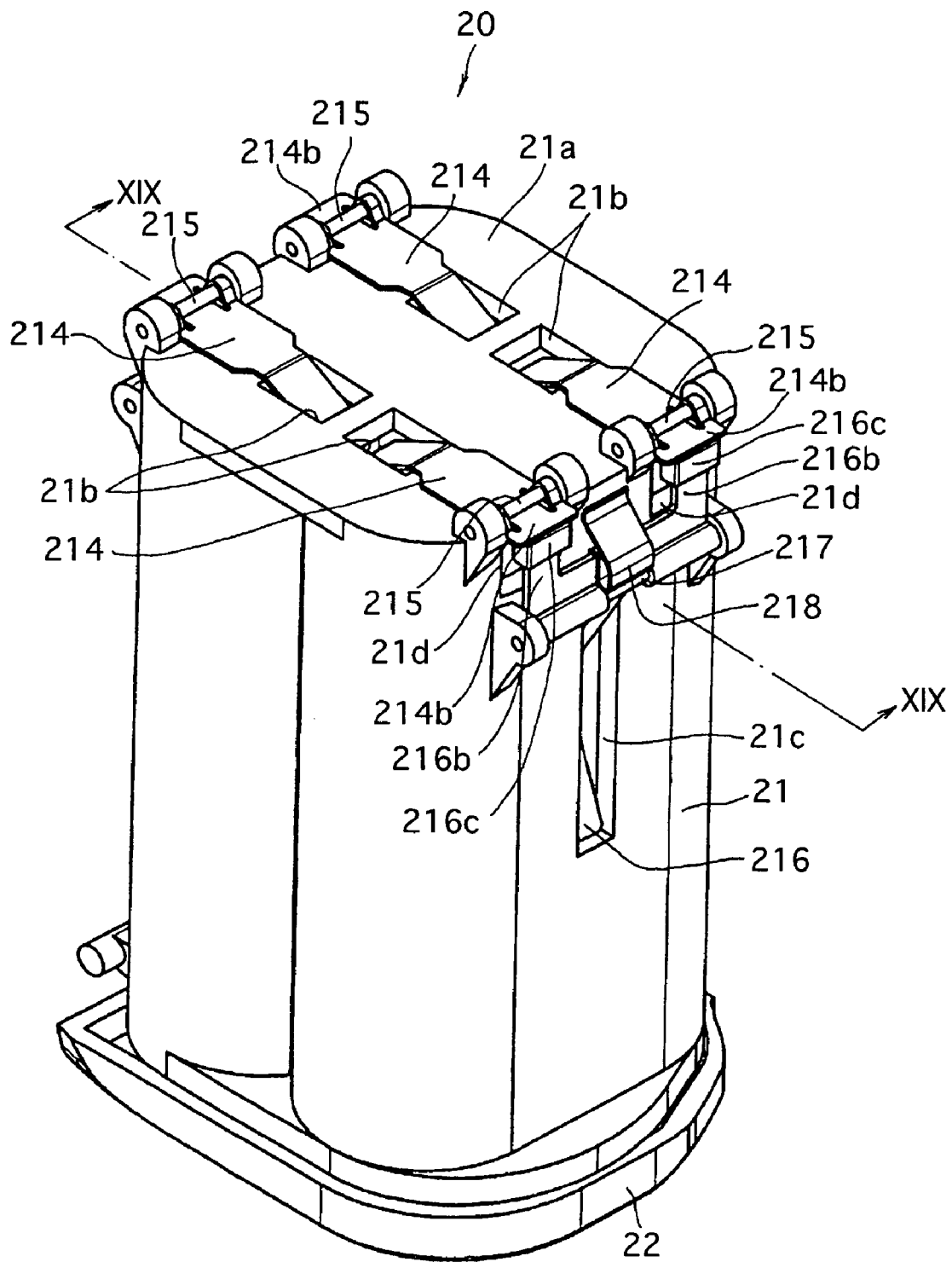
FIG. 18 is a perspective view of the battery case shown in FIG. 17, viewed obliquely from above.
Figure 19:
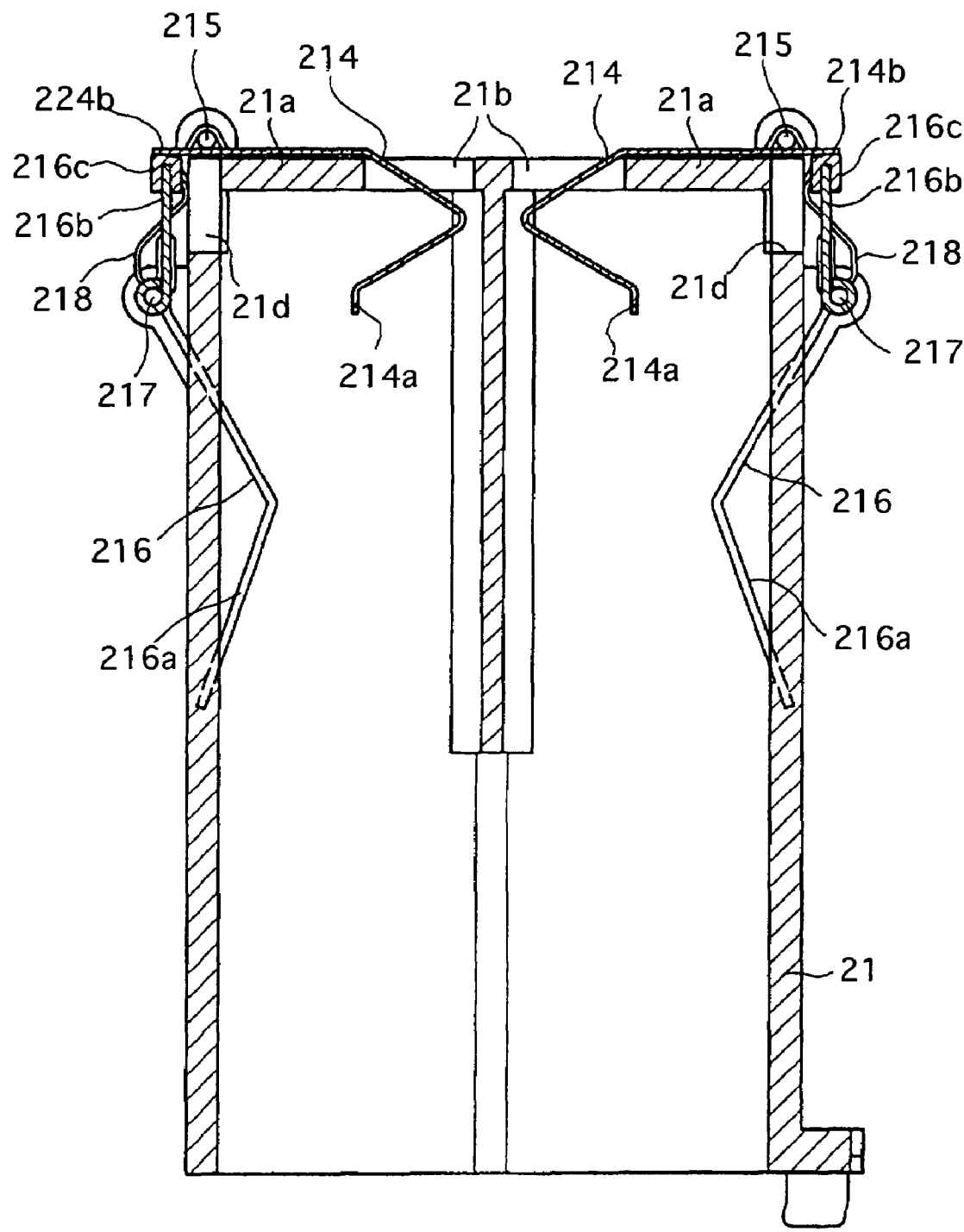
FIG. 19 is a cross sectional view taken along XIX-XIX line shown in FIG. 18.
Figure 20:
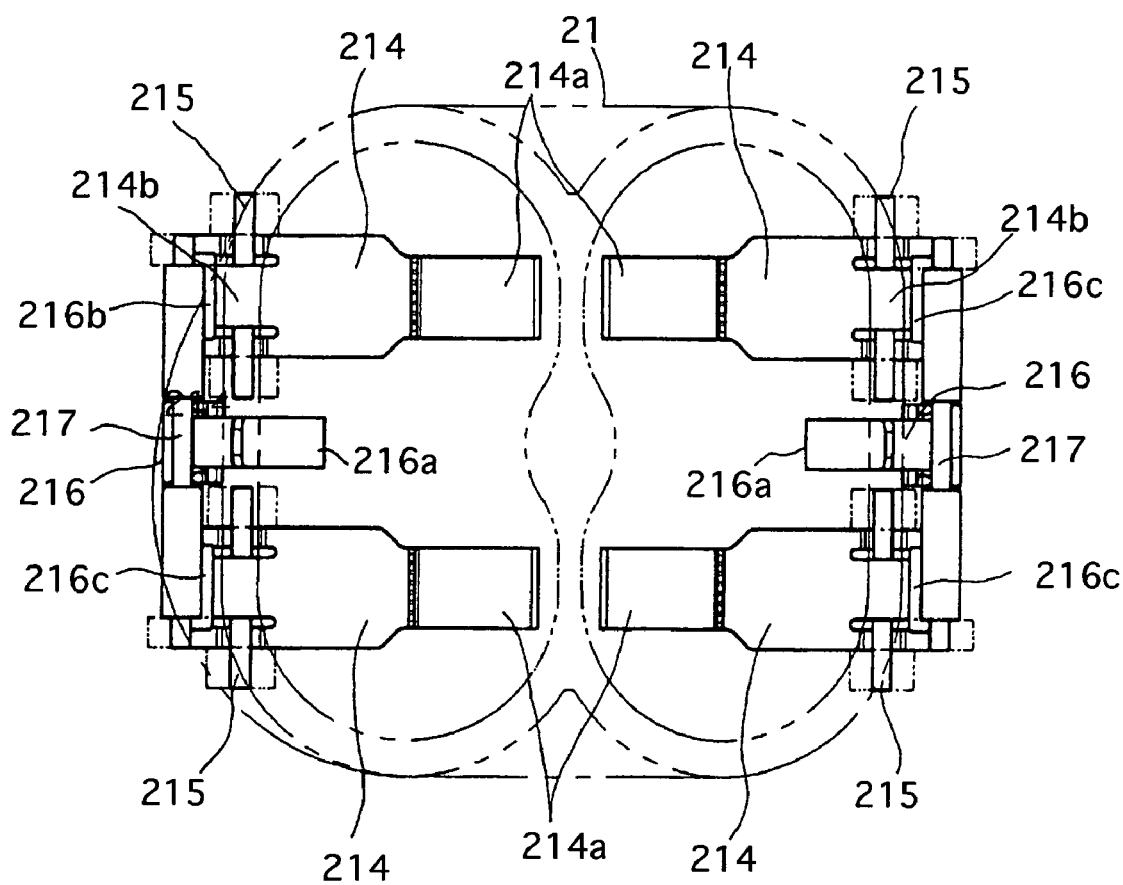
FIG. 20 is a bottom view of the battery case shown in FIG. 17 with the battery chamber lid being open.

FIG. 18 is a perspective view of the battery case 20, viewed obliquely from above, FIG. 19 is a cross sectional view taken along XIX-XIX line shown in FIG. 18, and FIG. 20 is a bottom view of the battery case 20 with the battery chamber lid 22 being open. In FIG. 20, elements such as four contacts (movable contacts) 214 and two battery detection levers 216 are shown by solid lines while the box portion 21 itself is shown by two-dot chain lines. As shown in FIGS. 18 through 20, the box portion 21 is provided, at four different positions of a top end wall 21a of the box portion 21 which respectively correspond to adjacent four electrodes of either the four AA-sized cells D1 or the two CR-V3 D2 accommodated in the box portion 21, with four through holes 21b, respectively. Four resilient contacts (resilient contact members) 214 are mounted to the top end wall 21a of the box portion 21 to correspond to the four through holes 21b, respectively. Each resilient contact 214 is made of a resilient metal leaf and has a predetermined shape formed by bending. Each resilient contact 214 is provided at a free end thereof with an end contact portion (springy portion) 214a having a substantially V-shaped cross section. The end contact portion (springy portion) 214a is inserted into the inside of the box portion 21 from the outside thereof through the associated through hole 21b to be capable of coming in contact with an electrode of the associated battery (AA-sized cell D1 or CR-V3 battery D2) accommodated in the box portion 21. Each resilient contact 214 is pivoted at an attached end (outer end) 214b thereof about a pivot shaft 215 to be rotatably movable in the direction of thickness of the attached end 214b, i.e., in the vertical direction. The pivot shaft 215 is elongated along the top end wall 21a and is horizontally positioned adjacent to an outer edge of the top end wall. Each resilient contact 214 is electrically connected to a circuit (not shown) provided inside of the camera body 1 via an associated conductive wire (not shown).

The box portion 21 is provided, on two side walls thereof opposed to each other (i.e., on two side walls thereof which face front walls of two CR-V3 batteries D2 when they are accommodated in the box portion 21), with two slots 21c having a predetermined length which are vertically elongated toward the bottom opening 211 from the top end wall 21a. The aforementioned two battery detection levers 216 are installed in the two slots 21c, respectively. The two battery detection levers 216 are pivoted at upper ends thereof about two horizontal pivot shafts 217 fixed to the aforementioned two side walls of the box portion 21, respectively, so that each battery detection lever 216 can vertically rotate about the associated horizontal pivot shaft 217. A lower end portion 216a of each battery detection lever 216 is bent to have a substantially V-shaped cross section, and is inserted into the interior of the box portion 21 through the associated slot 21c. On the other hand, an upper end portion 216b of each battery detection lever 216 is bifurcated into two horizontally in opposite directions to increase the width of the upper end portion 216b. Two caps 216c are put on the two ends of the bifurcated upper end portion 216b so that the two ends of the bifurcated upper end portion 216b are in contact with lower surfaces of the two attached ends 214b of the associated two contacts 214 via the two caps 216c, respectively. The two caps 216c are made of an insulating material to prevent the associated two contacts 214 from being short-circuited via the associated battery detection lever 216 because each battery detection lever 216 is made of a metal leaf. Two biasing leaf springs 218 are hooked to the two horizontal pivot shafts 217 with upper ends of the biasing leaf springs 218 remaining in pressing contact with the aforementioned two side walls of the box portion 21, respectively, to continuously bias the lower end portion 216a of each battery detection lever 216 toward the inside of the box portion 21 to be positioned inside of the box portion 21 as shown in FIG. 19. The box portion 21 is provided, on each of the aforementioned two side walls thereof at two positions thereon facing the two ends of the bifurcated upper end portion 216b of the associated battery detection lever 216, on which the two caps 216c are attached, with two clearance holes 21d which allow the two ends of the bifurcated upper end portion 216b of the associated battery detection lever 216 to enter the two clearance holes 21d, respectively, when the battery detection lever 216 rotates about the associated horizontal pivot shaft 217 in a direction to move the lower end portion 216a out of the box portion 21 (see FIGS. 23 and 24).

Figure 21:
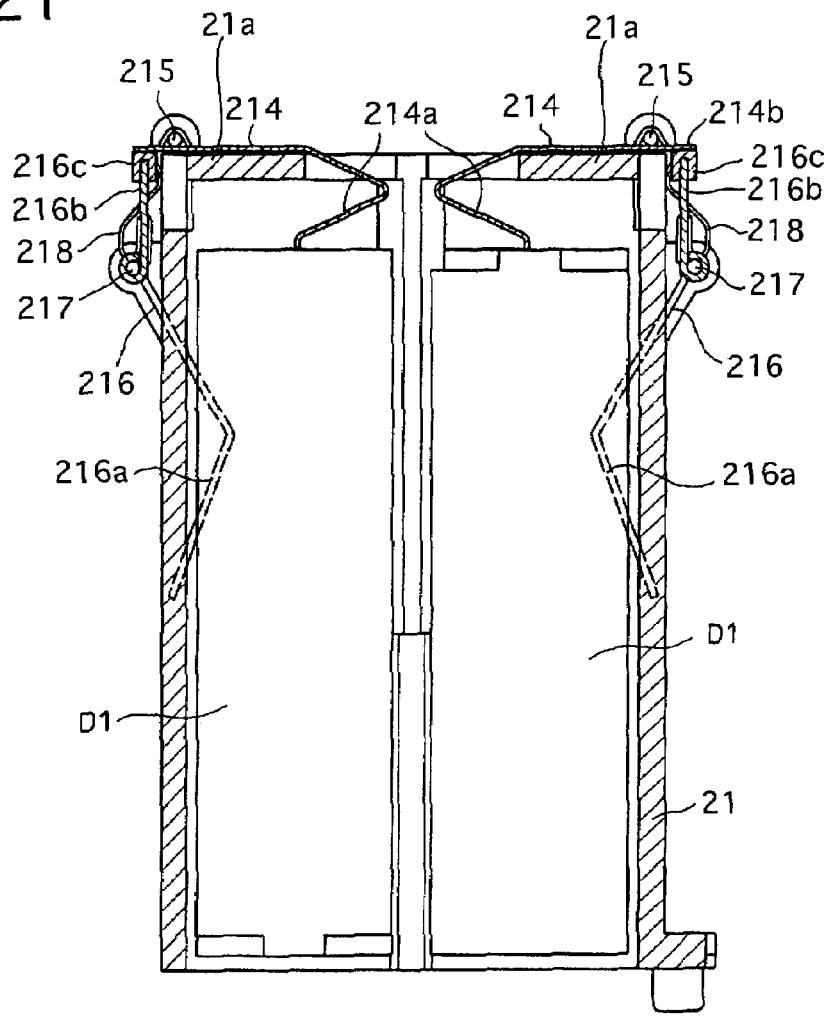
FIG. 21 is a longitudinal sectional view of the battery case shown in FIG. 17 with AA-sized cells being accommodated in the battery case.
Figure 22:
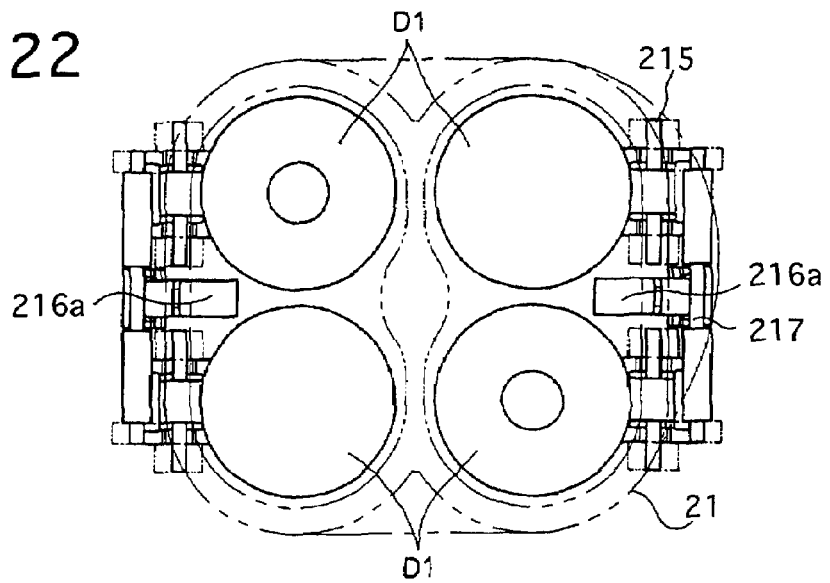
FIG. 22 is a bottom view of the battery case shown in FIG. 17 with AA-sized cells being accommodated in the battery case.
Figure 23:
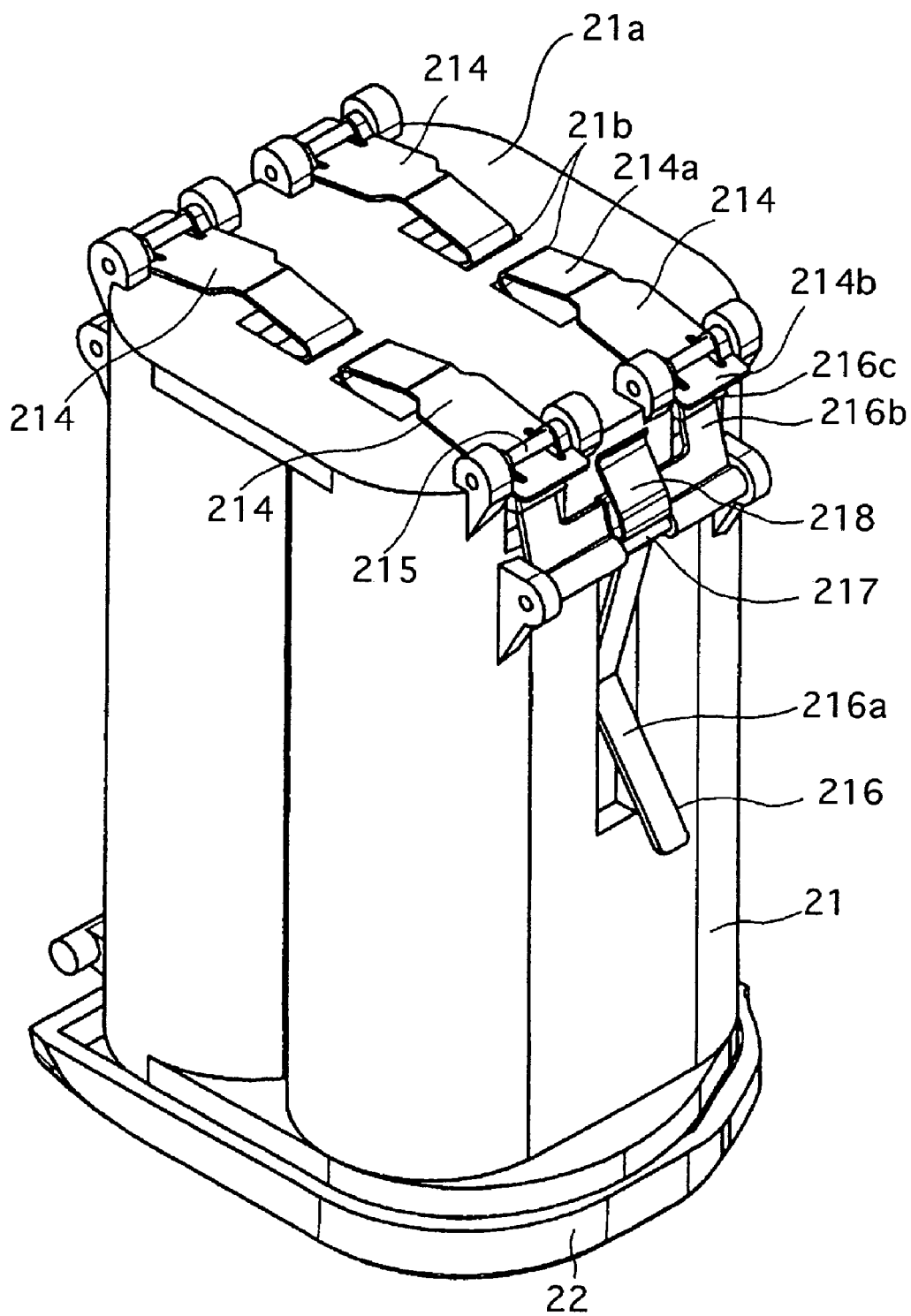
FIG. 23 is a perspective view of the battery case shown in FIG. 17 with CR-V3 batteries being accommodated therein.
Figure 24:
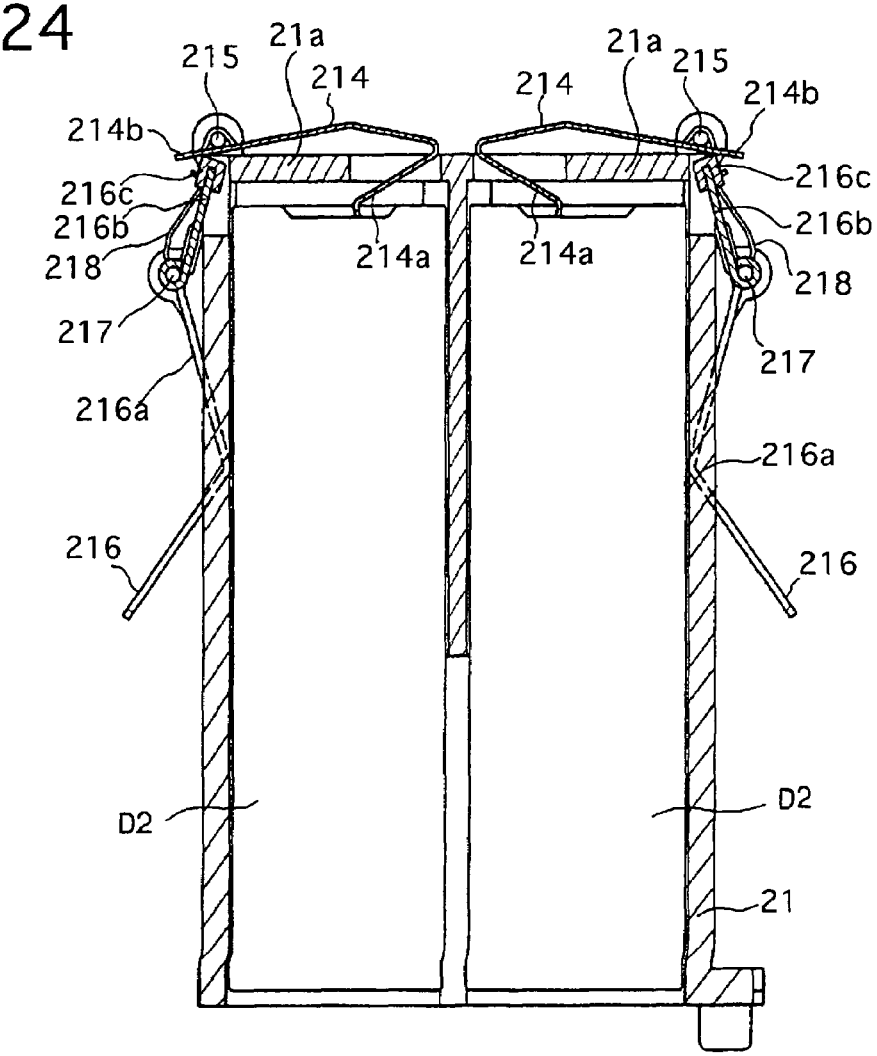
FIG. 24 is a longitudinal sectional view of the battery case shown in FIG. 17 with CR-V3 batteries being accommodated therein.
Figure 25:
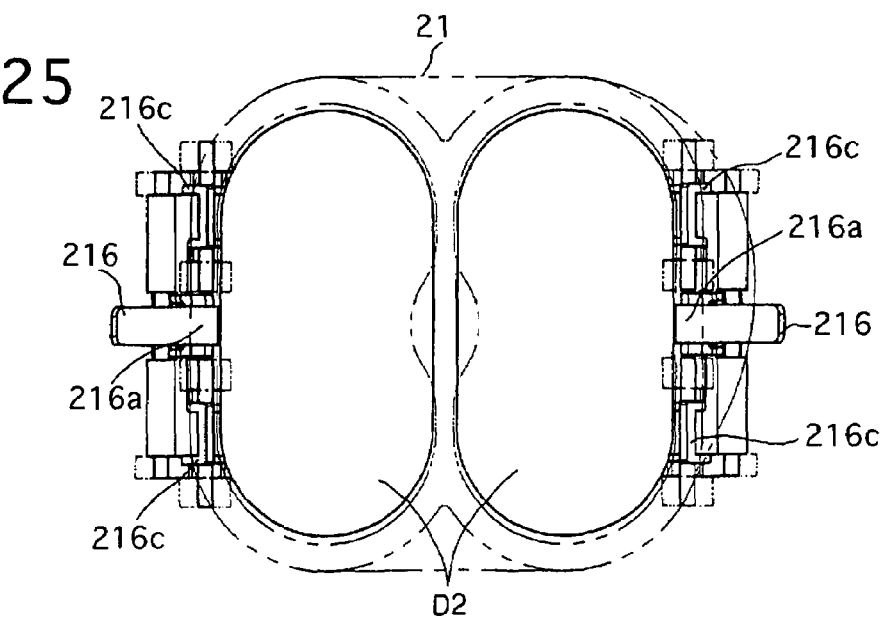
FIG. 25 is a bottom view of the battery case shown in FIG. 17 with CR-V3 batteries being accommodated therein.

The operating procedures for loading and unloading either four AA-sized cells D1 or two CR-V3 batteries D2 into and from the battery case 20 will be discussed hereinafter. FIGS. 21 and 24 are longitudinal sectional views taken along the same line (XIX-XIX line shown in FIG. 18) as the sectional view shown in FIG. 19. FIGS. 22 and 25 are bottom views viewed from the same direction as the bottom view shown in FIG. 20. Firstly, in the case where four AA-sized cells D1 are loaded into the battery case 20, four AA-sized cells D1 are inserted into the box portion 21 from the bottom opening 211 with the battery chamber lid 22 wide open in the second rotation direction A2. In practice, four AA-sized cells D1 are loaded into the battery case 20 with the battery case 20 turned upside down, in a position inverted from the position shown in FIG. 17. In a state where four AA-sized cells D1 are accommodated in the box portion 21, the lower end portion 216a of each battery detection lever 216 remains positioned in between the two AA-sized cells D1 adjacent to the lower end portion 216a without being in contact with either of the two AA-sized cells D1 (see FIG. 22), so that each battery detection lever 216 is held by the associated biasing leaf spring 218 in a position in which the lower end portion 216a of each battery detection lever 216 is positioned inside of the box portion 21 as shown in FIGS. 21 and 22. Accordingly, in state where four AA-sized cells D1 are accommodated in the box portion 21, the two caps 216c that are put on the two ends of the bifurcated upper end portion 216b of each battery detection lever 216 are in contact with lower surfaces of the attached ends 214b of the associated two contacts 214, respectively, to prevent each contact 214 from rotating about the associated pivot shaft 215 substantially upwards in the vertical direction and simultaneously the end contact portion 214a of each contact 214 is relatively deeply inserted into the inside of the box portion 21 from the outside thereof through the associated through hole 21b of the top end wall 21a as shown in FIG. 21. Accordingly, four electrodes (upper electrodes as viewed in FIG. 21) of the four AA-sized cells D1 which are adjacent to the top end wall 21a are in pressing contact with the four contacts 214, respectively; however, each contact 214 does not rotate about the associated pivot shaft 215 and only the end contact portion 214a of each contact 214 is resiliently deformed due to the engagement of the attached end 214b thereof with the associated cap 216c. The resilient force produced by this resilient deformation of the end contact portion 214a brings the end contact portion 214a into proper electrical contact with an electrode of the associated AA-sized cell D1.

Thereafter, the battery chamber lid 22 is closed by rotating the battery chamber lid 12 in the first rotation direction A1. Subsequently, sliding the battery chamber lid 22 in the first sliding direction B1 (see FIG. 1) with the battery chamber lid 22 remaining closed causes the first lid-locking lug 222 and the second lid-locking lug 223 that are shown in FIG. 17 to be engaged with the first lid-locking lug 212 and the second lid-locking lug 213, respectively, to thereby lock the battery chamber lid 22 relative to the box portion 21, so that the closed state of the battery chamber lid 22 is maintained. Conversely, when four AA-sized cells D1 are removed out of the battery case 20, sliding the battery chamber lid 22 in the second sliding direction B2 (see FIG. 1) causes the first lid-locking lug 222 and the second lid-locking lug 223 to be disengaged from the first lid-locking lug 212 and the second lid-locking lug 213, respectively, to thereby unlock the battery chamber lid 22 relative to the box portion 21. Thereupon, the four AA-sized cells D1 accommodated in the box portion 21 can be removed therefrom after the battery chamber lid 22 is rotated about the hinge 22 in the second rotation direction A2.

On the other hand, in the case where two CR-V3 batteries D2 are loaded into the battery case 20, two CR-V3 batteries D2 are inserted into the box portion 21 from the bottom opening 211 with the battery chamber lid 22 wide open in the second rotation direction A2. Thereupon, the lower end portion 216a of each battery detection lever 216 comes into contact with an outer side surface (front surface) of the associated CR-V3 D2 as shown in FIGS. 24 and 25, which causes each battery detection lever 216 to rotate in a direction to move out of the box portion 21 against the spring force of the associated biasing leaf spring 218. This rotation of each battery detection lever 216 causes the bifurcated upper end portion 216b of each battery detection lever 216 to tilt inwards so that each cap 216c is disengaged from the lower surface of the attached ends 214b of the associated contact 214. This disengagement causes each contact 214 to be free from the associated battery detection lever 216, thus causing each contact 214 to be freely rotatable about the associated pivot shaft 215. On this account, after the four electrodes of the two CR-V3 batteries D2 respectively come into contact with the end contact portions 214a of the four contacts 214, a further insertion of each CR-V3 D2 causes each contact 214 to rotate about the associated pivot shaft 215 outwards, i.e., in a direction to move the end contact portion 214a thereof out of the box portion 21 through the associated through hole 21b. Consequently, each contact 214 is positioned so that the end contact portion 214a thereof relatively slightly enters the box portion 21 from the outside thereof through the associated through hole 21b of the top end wall 21a as shown in FIG. 24. Accordingly, each contact 214 has rotated outwards through a slight angle to be in contact with an electrode of the associated CR-V3 battery D2 while being resiliently deformed, and accordingly, the resilient force exerted by each contact 214 to the associated CR-V3 battery D2 is small, thus allowing each CR-V3 battery D2 to be inserted all the way into the box portion 21.

Thereafter, similar to the case using four AA-sized cells D1, the closed state of the battery chamber lid 22 can be maintained by sliding the battery chamber lid 22 in the first sliding direction B1 (see FIG. 1) with the battery chamber lid 22 remaining closed to make the first lid-locking lug 222 and the second lid-locking lug 223 engage with the first lid-locking lug 212 and the second lid-locking lug 213, respectively. In this case, the battery chamber lid 22 does not interfere with either of the two CR-V3 batteries D2, and accordingly, the battery chamber lid 22 can be operated to slide by a small force. Moreover, when the battery chamber lid 22 is operated to remove the two CR-V3 batteries D2 out of the battery case 20, the battery chamber lid 22 can also be operated to slide by a small force though operated to slide in the second sliding direction B2.

In this manner, the resilient force produced by a resilient deformation of each of the four contacts 214 is substantially reduced, which makes it possible for each CR-V3 battery D2 to be inserted deeply into the box portion 21 when the two CR-V3 batteries D2 are accommodated in the box portion 20. Therefore, when the battery chamber lid 22 is closed, one does not need to press the two CR-V3 batteries D2 into the box portion 21 while closing the battery chamber lid 22, which makes it possible for the battery chamber lid 22 to be closed lightly by a small force. Moreover, the battery chamber lid 22 can also be closed lightly by a small force when the two CR-V3 batteries D2 are removed from the battery case 20.

A third embodiment of the battery case will be hereinafter discussed with reference to FIGS. 26 through 38. Similar to each of the first embodiment of the battery case 10 and the second embodiment of the battery case 20, the third embodiment of the battery case 30 is positioned inside of the grip portion 3 shown in FIG. 1.

Figure 26:
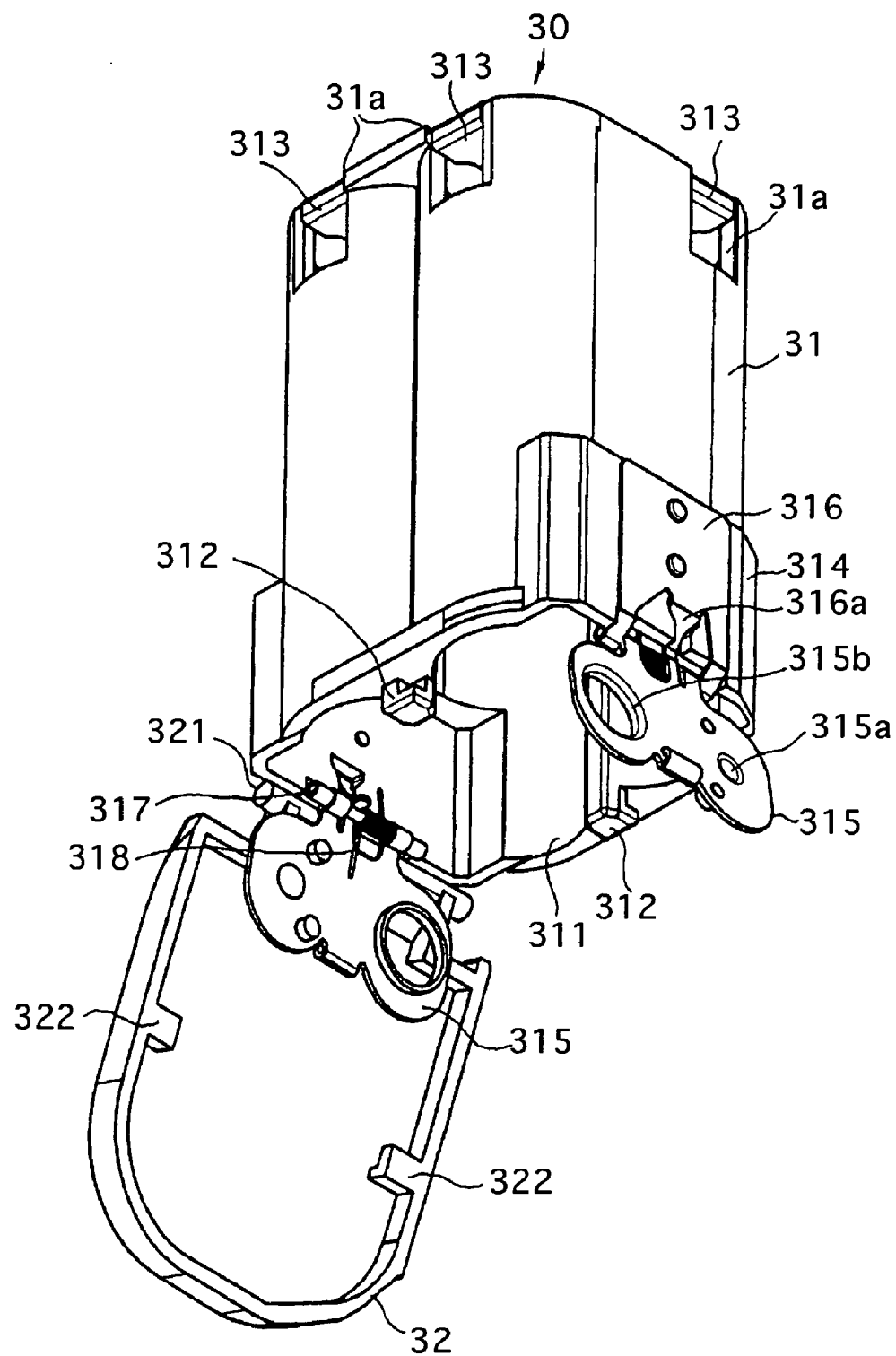
FIG. 26 is an exploded perspective view of a third embodiment of the battery case of the camera body shown in FIG. 1.

FIG. 26 is a perspective view of the battery case 30 in a state where the battery case 30 is removed from the camera body 1. The battery case 30 includes a box portion 31 and a battery chamber lid 32. The box portion 31 having a substantially hollow rectangular columnar shape and forming a battery chamber is provided at the bottom thereof with a bottom opening 311 which is opened and closed by the battery chamber lid 32. Each of the box portion 31 and the battery chamber lid 32 is molded of resin. The shape and dimensions of the battery chamber formed inside of the battery case 30 are determined so that either four AA-sized cells D1 or two CR-V3 batteries D2 can be accommodated in the battery case 30 with the four AA-sized cells D1 arranged in a two-by-two arrangement or with the two CR-V3 batteries D2 arranged in a side-by-side parallel arrangement, respectively. The battery chamber lid 32 is hinged on the bottom wall 1a of the camera body 1 along one side of the bottom opening 311 via a hinge 321. The box portion 31 is provided, on a bottom end surface thereof on laterally opposite sides of the bottom opening 311, with two lid-locking lugs 312 which project downwards. The two lid-locking lugs 312 are formed integrally with the bottom end surface of the box portion 31 at the bottom opening 311. As shown in FIG. 26, each lid-locking lug 312 is formed to have an L-shape in cross section so that a locking groove is formed between the lid-locking lug 312 and the bottom end surface of the box portion 31.

On the other hand, the battery chamber lid 32 is provided, on an inner surface thereof at two points facing the two lid-locking lugs 312 in a closed state of the battery chamber lid 32, with two lid-locking lug 322 which are engaged with the two lid-locking lugs 312, respectively, when the battery chamber lid 32 is operated to slide in the first sliding direction B1. Each lid-locking lug 322 projects to have a substantially L-shape in cross section to be engageable with the associated lid-locking lug 312. Therefore, the two lid-locking lug 322 are respectively engaged with the two lid-locking lugs 312 to lock the battery chamber lid 32 relative to the box portion 31 by sliding the battery chamber lid 32 in the first sliding direction B1 (see FIG. 1), which is parallel to the bottom wall 1a of the camera body 1, after having rotated the battery chamber lid 32 in the first rotation direction A1 up to a point at which the bottom opening 311 is closed by the battery chamber lid 32. Conversely, the two lid-locking lugs 322 are disengaged from the two lid-locking lugs 312, respectively, by sliding the battery chamber lid 32 in the second sliding direction B2 (opposite to the first sliding direction B1) shown in FIG. 1. Upon this disengagement, the battery chamber lid 32 is allowed to be opened in the second rotation direction A2 via the hinge 321. The battery chamber lid 32 is loosely hinged on the bottom wall 1a via the hinge 321 to be slidable in the sliding directions B1 and B2 by a slight amount of movement.

Figure 27:
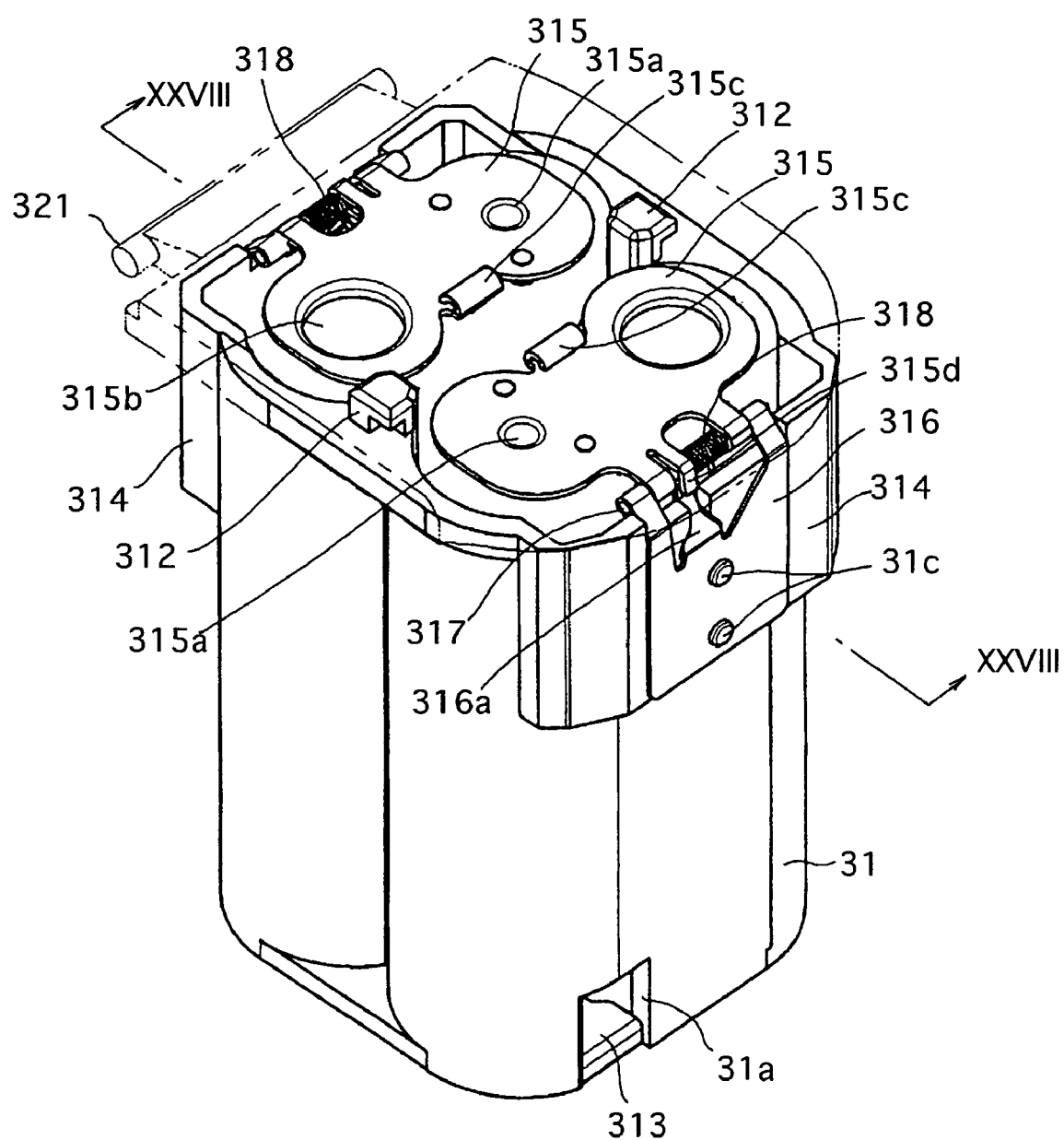
FIG. 27 is a perspective view of the battery case shown in FIG. 26, viewed from the bottom side thereof with the battery case being positioned upside down.
Figure 28:
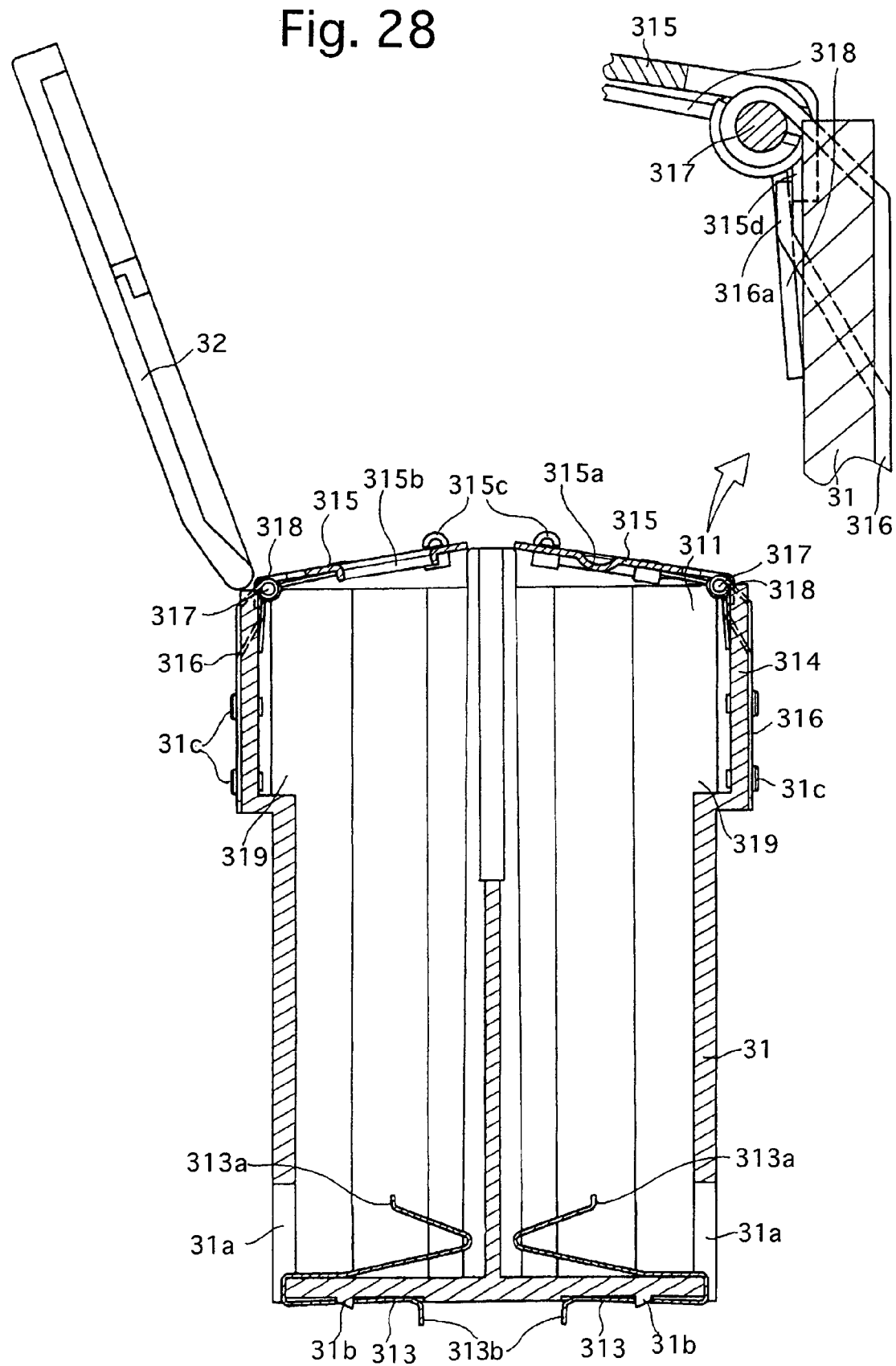
FIG. 28 is a cross sectional view taken along XXVIII-XXVIII line shown in FIG. 27.

FIG. 27 is a perspective view of the battery case 30, viewed obliquely from above, and FIG. 28 is a cross sectional view taken along XXVIII-XXVIII line shown in FIG. 27. The box portion 31 is provided, at four different positions of a top end wall (which is positioned at the bottom as viewed in FIGS. 27 and 28) of the box portion 31 which respectively correspond to adjacent four electrodes of either the four AA-sized cells D1 or the two CR-V3 D2 accommodated in the box portion 31, with four through holes 31a (only one of them is shown in FIG. 27), respectively. Four resilient contacts (resilient contact members) 313 are mounted to the top end wall of the box portion 31 to correspond to the four through holes 31a, respectively. Each resilient contact 313 is made of a resilient metal leaf and has a predetermined shape which is formed by bending. Each resilient contact 313 is provided at a free end thereof with an end contact portion (springy portion) 313a having a substantially V-shaped cross section. The end contact portion 313a is inserted into the inside of the box portion 31 from the outside thereof through the associated through hole 31a to be capable of coming in contact with an electrode of the associated battery (AA-sized cell D1 or CR-V3 battery D2) accommodated in the box portion 31. Each resilient contact 313 is designed so that the end contact portion 313a thereof has proper dimensions and a proper spring force to make the bottom of each CR-V3 battery D2 project slightly from the bottom opening 311 and to allow the battery chamber lid 32 to be opened and closed easily when relatively-long two CR-V3 batteries are accommodated in the battery case 30. A fixed end portion 313b of the resilient contact 313 is shaped like a clip and is snapped onto the top end wall of the box portion 31 to be fixed thereto via an associated projection 31b which projects upwards (downwards as viewed in FIG. 28) from the top end wall of the box portion 31 as shown in FIG. 28. Each resilient contact 313 is electrically connected to a circuit (not shown) provided inside of the camera body 1 via an associated conductive wire (not shown).

Bottom portions (upper portions as viewed in FIG. 28) of opposite side walls of the box portion 31 which face front walls of the two CR-V3 batteries D2 when the two CR-V3 batteries D2 are accommodated in the box portion 31 bulge outwards in opposite directions away from each other to be formed as two bulged portions 314 which extend vertically by a predetermined length from the bottom opening 311. A pair of hinged plate contacts (movable contacts) 315 are hinged at lower ends (upper ends as viewed in FIG. 28) of the two bulged portions 314 to be capable of rotating forward and reverse in the vertical direction, i.e., capable of opening like a double-leafed hinged door. Each hinged plate contact 315 is made of a metal plate. When four AA-sized cells D1 are accommodated in the box portion 11, each hinged plate contact 315 comes in contact with adjacent electrodes (positive and negative electrodes) of the associated two of the four AA-sized cells D1 so that these two AA-sized cells D1 are connected in series. Each hinged plate contact 315 is shaped like a butterfly wing has a protuberance 315*a* and a circular apertured portion 315*b* greater in diameter than the protuberance 315*a*. The protuberance 315*a* and the circular apertured portion 315*b* contact positive and negative electrodes of the associated two AA-sized cells D1. respectively, when the AA-sized cells D1 are inserted into the battery case 30. Each hinged plate contact 315 is provided on an outer surface thereof with a contacting projection 315*c* which comes in contact with an inner surface of the battery chamber lid 32 when the battery chamber lid 32 is closed. The contacting projection 315*c* of each hinged plate contact 315 is formed by bending.

Two bearing plates 316, each of which is made of a resilient metal plate, are fixed to outer side surfaces of the two bulged portions 314 by set crews 31*c* to hold two pivot shafts 317 horizontally parallel to each other at the bottom ends of the two bulged portions 314, respectively. The two hinged plate contacts 315 are pivoted about the two pivot shafts 317, respectively. Each hinged plate contact 315 is biased to rotate toward the outside of the bottom opening 311 by an associated torsion coil spring 318 fitted on the associated pivot shaft 317. A click spring leaf 316*a* is formed integral with each bearing plate 316 to extend toward the associated pivot shaft 317. Each hinged plate contact 315 is provided at a pivoted end thereof with a click piece 315*d* having an L-shape in cross section. When each hinged plate contact 315 together with the click piece 315*d* thereof rotates about the associated pivot shaft 317, the associated click spring leaf 316*a* faces the click piece 315*d* at some midpoint in this rotation of the hinged plate contact 315. The click piece 315*d* and the click spring leaf 316*a* constitute a click device for holding the hinged plate contact 315 in a closed position.

Figure 29:
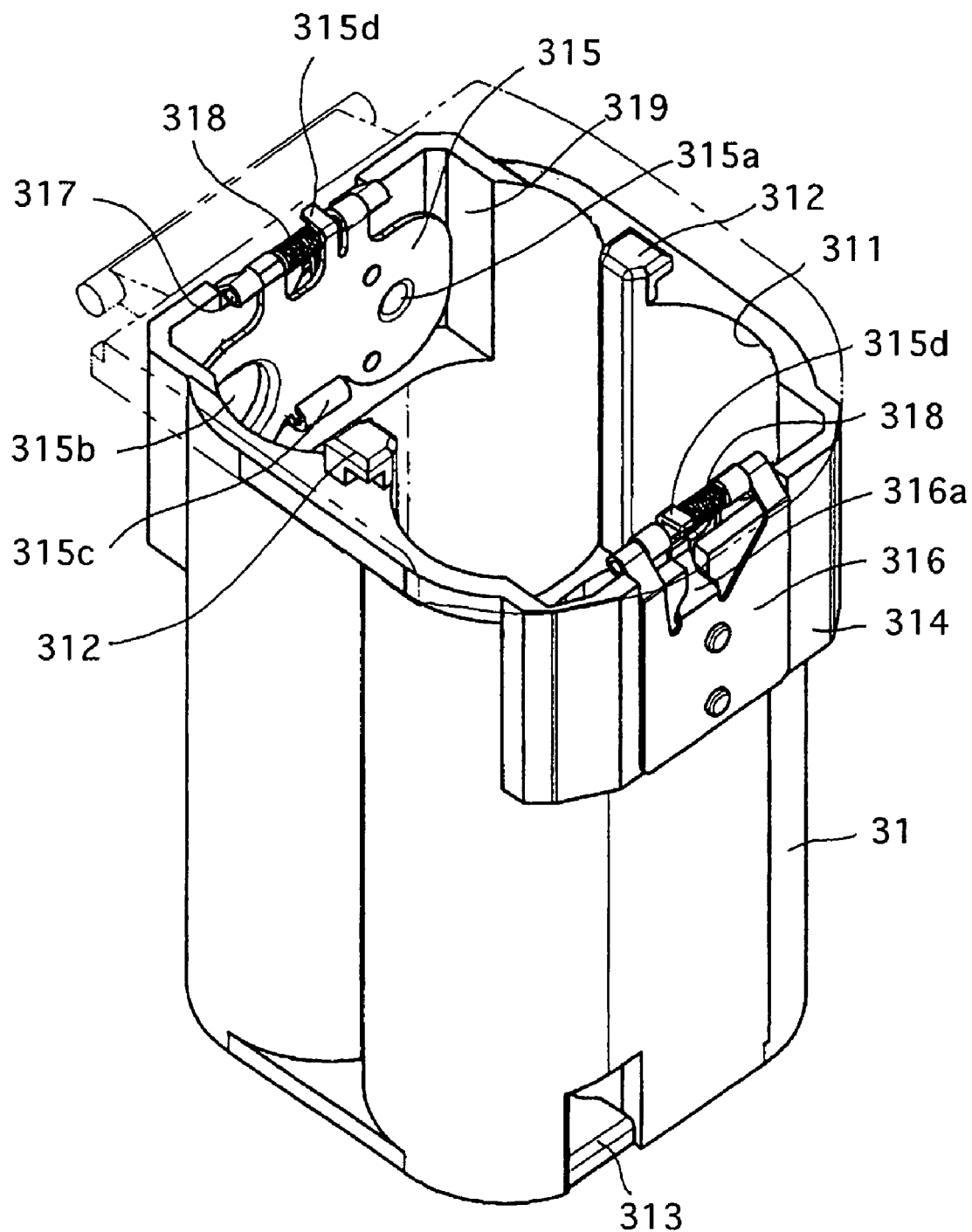
FIG. 29 is a perspective view of the battery case shown in FIG. 26 in a state where movable contacts are accommodated.

The box portion 31 is provided therein immediately inside of the two bulged portions 314 with two accommodation recesses 319 for accommodating the two hinged plate contacts 315 along inner surfaces of the two bulged portions 314, respectively. Specifically, as shown in FIG. 29 that is viewed from the same angle as FIG. 27, the two hinged plate contacts 315 are accommodated in the two accommodation recesses 319 along inner surfaces of the box portion 31 when rotated inward about the pivot shafts 317, respectively. Due to this structure, either four AA-sized cells D1 or two CR-V3 batteries D2 can also be accommodated in the box portion 31 when the two hinged plate contacts 315 are accommodated in the two accommodation recesses 319, respectively.

Figures 30, 31:
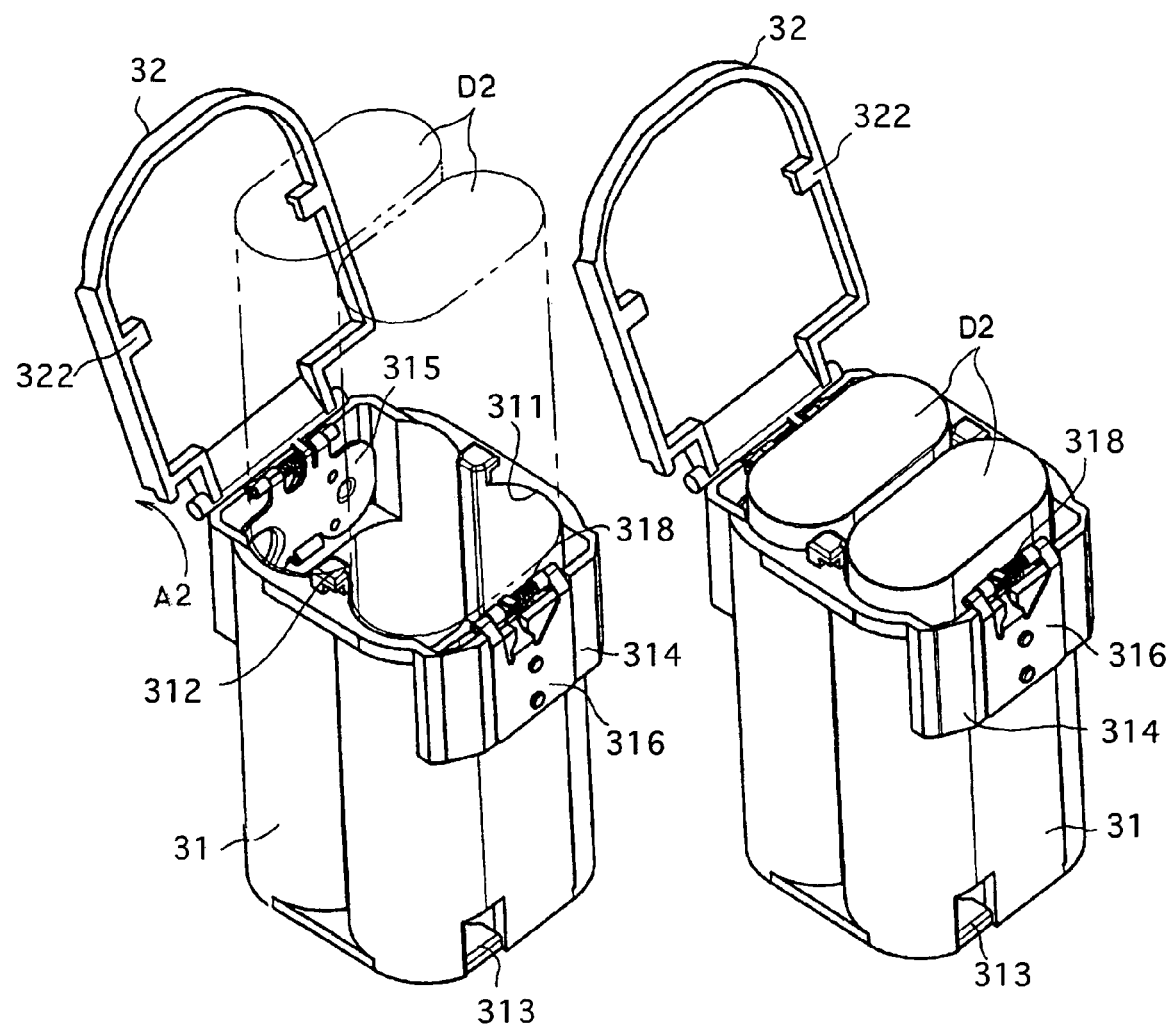
FIGS. 30 and 31 are perspective views of the battery case shown in FIG. 26 for illustrating how to load two CR-V3 batteries into the battery case.
Figure 32:
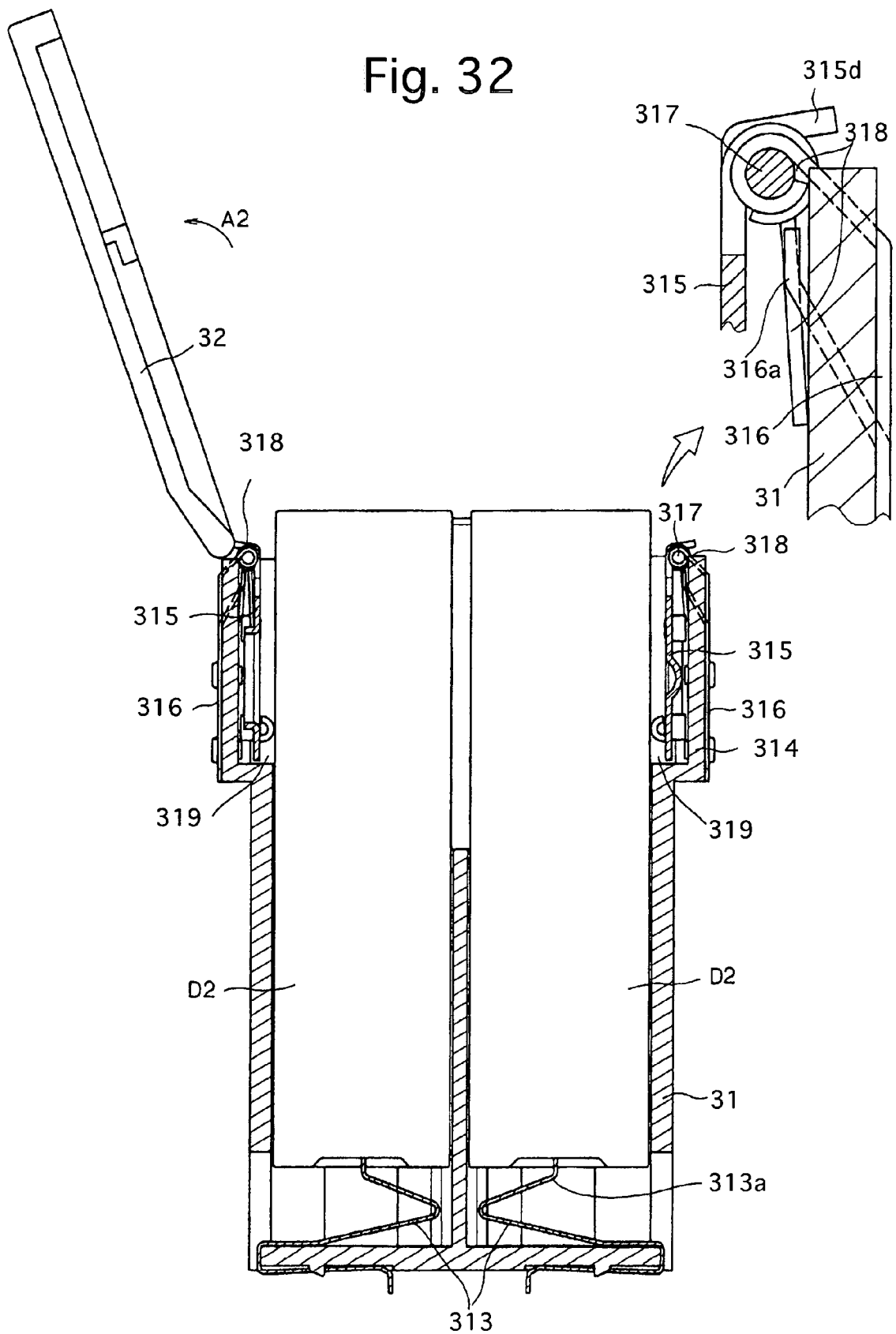
FIG. 32 is a longitudinal sectional view of the battery case shown in FIG. 26 in a state where two CR-V3 batteries are partially inserted into the battery case.

The operating procedures for loading and unloading either four AA-sized cells D1 or two CR-V3 batteries D2 into and from the battery case 30 will be discussed hereinafter. FIGS. 30 and 31 illustrate how to load two CR-V3 batteries D2 into the battery case 30. Note that the drawings which will be referenced in the following description show the battery case 30 in the case where either four AA-sized cells D1 or two CR-V3 batteries D2 are loaded into the battery case 30 with the battery case 30 turned upside down. In the case where two CR-V3 batteries D2 are loaded into the battery case 30, two CR-V3 batteries D2 are inserted into the box portion 31 from the bottom opening 311 with the battery chamber lid 32 wide open in the second rotation direction A2 as shown in FIG. 30, however, the two hinged plate contacts 315 are in a covering position as shown in FIGS. 27 and 28 (rather than in the position shown in FIG. 30) in which the two hinged plate contacts 315 cover the bottom opening 311 because the click piece 315*d* of each hinged plate contact 315 is engaged with an outer surface of the click spring leaf 316*a* of the associated bearing plate 316 even though each hinged plate contact 315 is biased outwards by the associated torsion coil spring 318. From this state, inserting the two CR-V3 batteries D2 into the box portion 31 causes the two hinged plate contacts 315 to rotate toward the inside of the box portion 31 against the biasing force of the two torsion coil springs 318 while being pressed by the two CR-V3 batteries D2, respectively. Upon the two CR-V3 batteries D2 being inserted into the box portion 31, the two hinged plate contacts 315 are accommodated in the two accommodation recesses 319 along inner surfaces of the box portion 31, respectively, as shown in FIG. 31. This state of the two hinged plate contacts 315 is the same as that shown in FIGS. 29 and 30. This state is also shown in the longitudinal cross sectional view of the battery case shown FIG. 32. Accordingly, the two CR-V3 batteries D2 can be loaded into the battery case 30 without directly operating either of the two hinged plate contacts 315.

Figure 33:
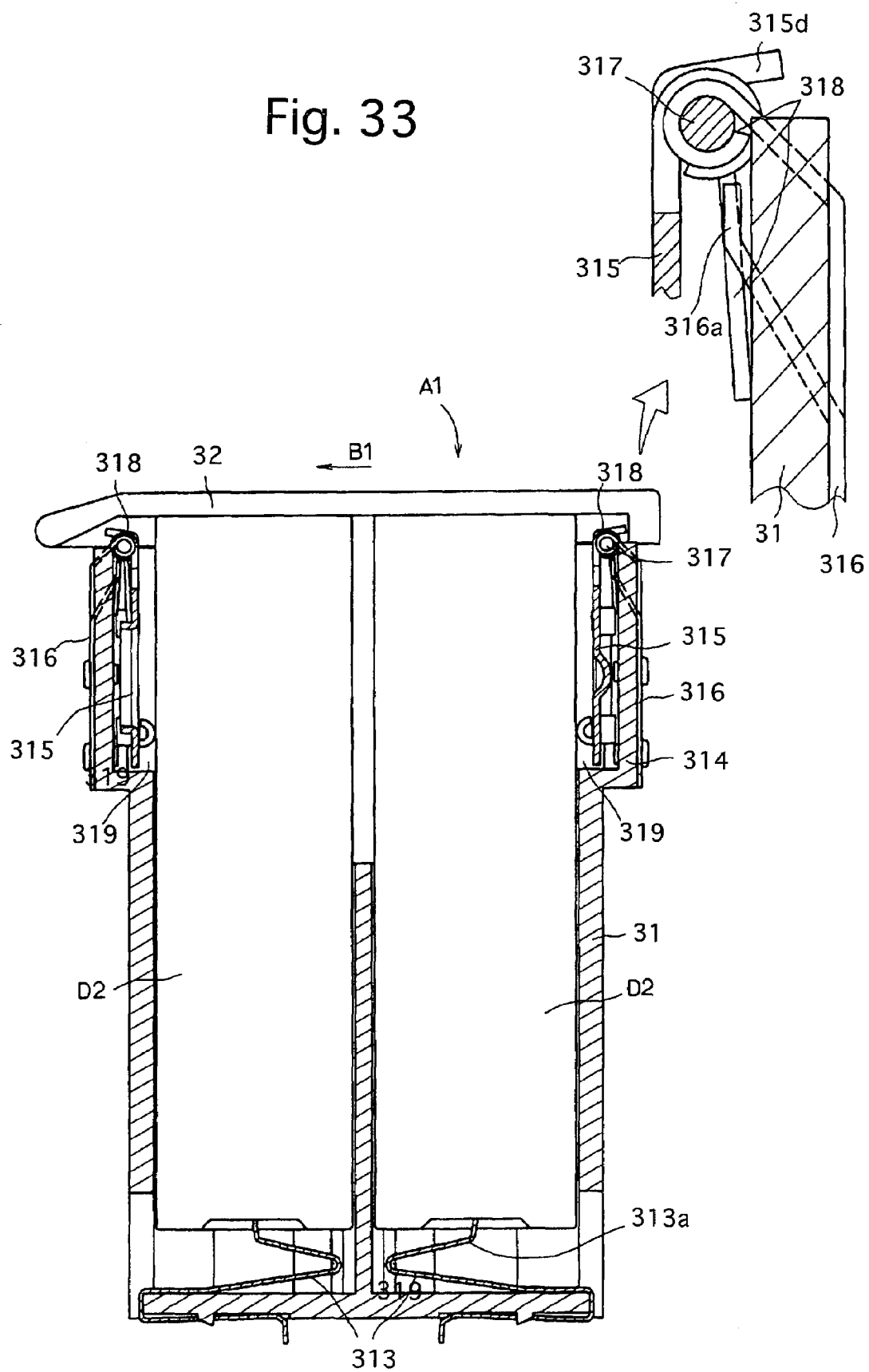
FIG. 33 is a longitudinal sectional view of the battery case shown in FIG. 26 in a state where two CR-V3 batteries are fully inserted in the battery case while the battery chamber lid is closed.

Upon the two CR-V3 batteries D2 being put into the box portion 11 from the bottom opening 311, the spring force exerted by each resilient contact 313 to the associated CR-V3 battery D2 when an electrode thereof comes in contact with the resilient contact 313 is small because each resilient contact 313 is designed to have appropriate dimensions and an appropriate spring force which correspond to the CR-V3 battery D2, which makes it possible for two CR-V3 batteries D2 to be inserted deeply into the box portion 31. Therefore, if the battery chamber lid 32 is operated to rotate in the first rotation direction A1 to close the bottom opening 311 from the state shown in FIG. 32, and subsequently the battery chamber lid 32 is operated to slide in the first sliding direction B1 with the bottom opening 311 remaining closed by the battery chamber lid 32 as shown in FIG. 33, each of the two lid-locking lugs 322 that are shown in FIG. 26 slides into a locking groove formed between the associated lid-locking lug 312 and the bottom end surface of the box portion 31 to be engaged with the associated lid-locking lug 312 so that the closed state of the battery chamber lid 32 is maintained. Conversely, when the two CR-V3 batteries D2 are removed out of the battery case 30, each lid-locking lug 322 is disengaged from the associated locking groove between the associated lid-locking lug 312 and the bottom end surface of the box portion 31 by sliding the battery chamber lid 32 in the second sliding direction B2, and then the battery chamber lid 32 is opened by rotating the battery chamber lid 32 in the second rotation direction A2. Thereupon, the two CR-V3 batteries D2 accommodated in the box portion 31 can be removed therefrom after the bottom opening 311 is widely opened.

Figures 34, 35:
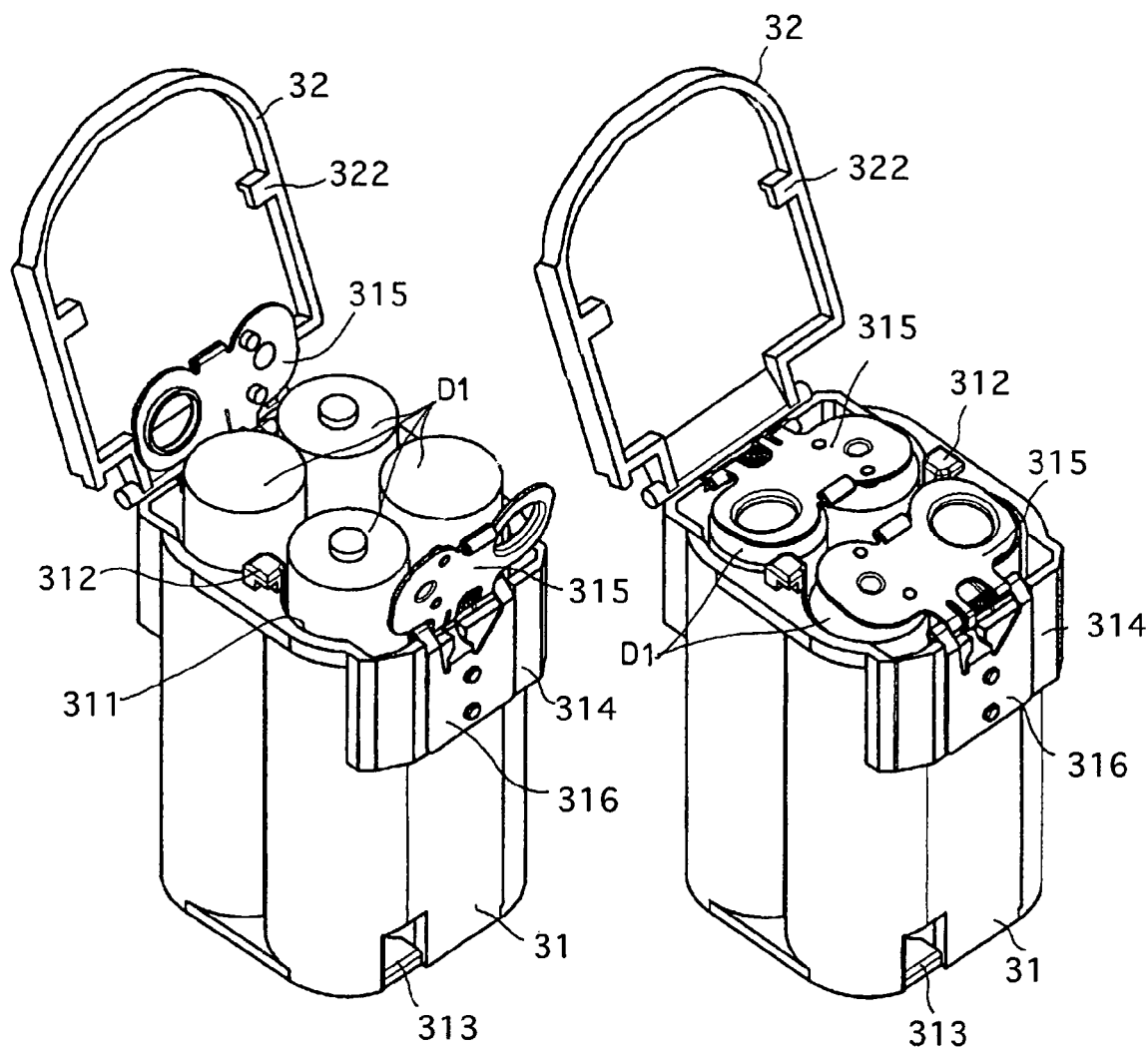
FIGS. 34 and 35 are perspective views of the battery case shown in FIG. 26 for illustrating how to load four AA-sized cells into the battery case.
Figure 36:
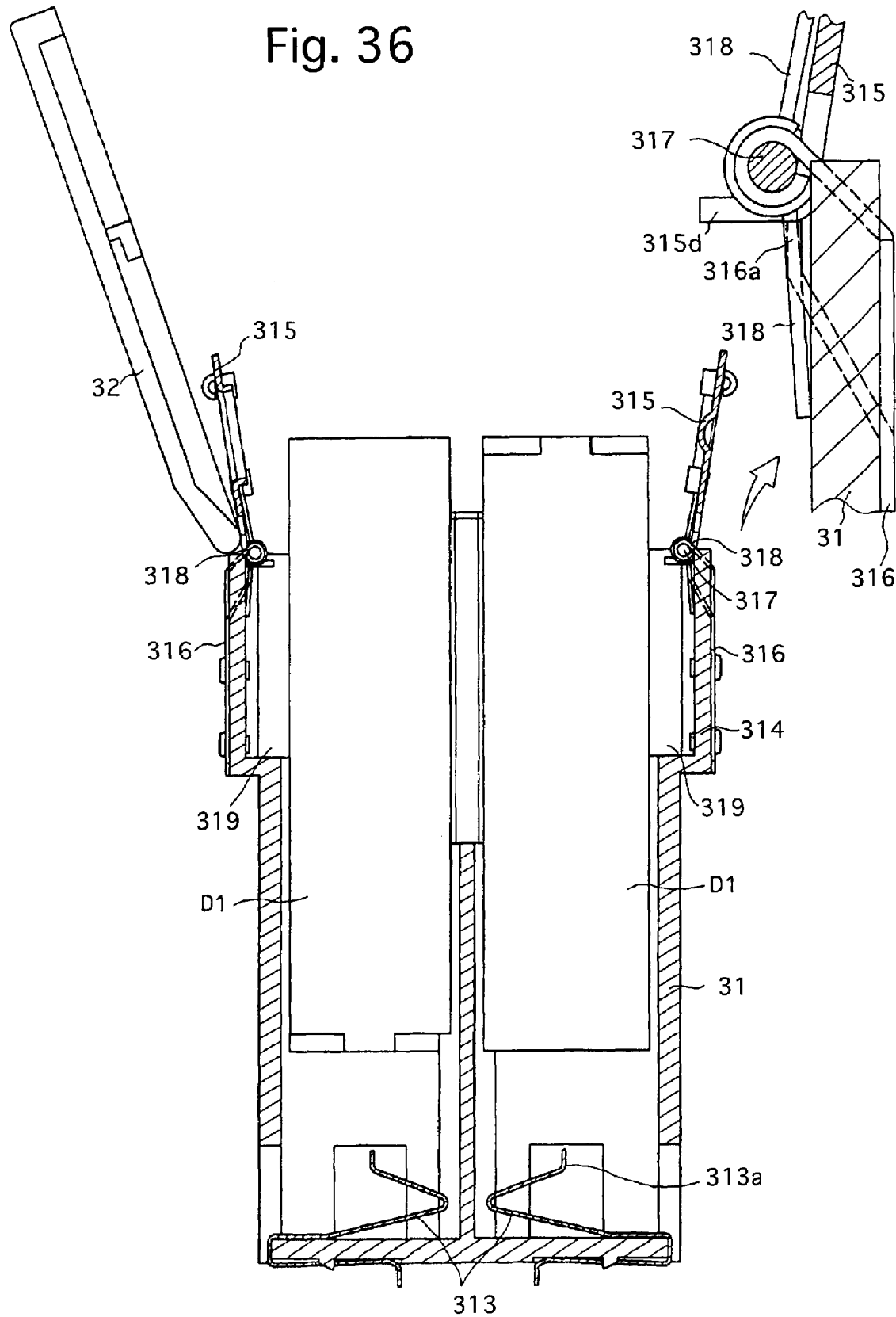
FIG. 36 is a longitudinal sectional view of the battery case shown in FIG. 26 in a state where AA-sized cells are partially inserted into the battery case.

On the other hand, when four AA-sized cells D1 are inserted into the battery case 30, the two hinged plate contacts 315 are manually opened to extend in substantially the lengthwise direction of the box portion 31 as shown in FIGS. 34 and 36. At this time, the click piece 315*d* of each hinged plate contact 315 has moved across the click spring leaf 316*a* of the associated bearing plate 316 to be positioned on the inside of the click spring leaf 316*a* thereof, so that the opened state of each hinged plate contact 31 is maintained by the spring force of the associated torsion coil spring 318, thereby opening the bottom opening 311 so that four AA-sized cells D1 can be inserted into the box portion 31.

Figure 37:
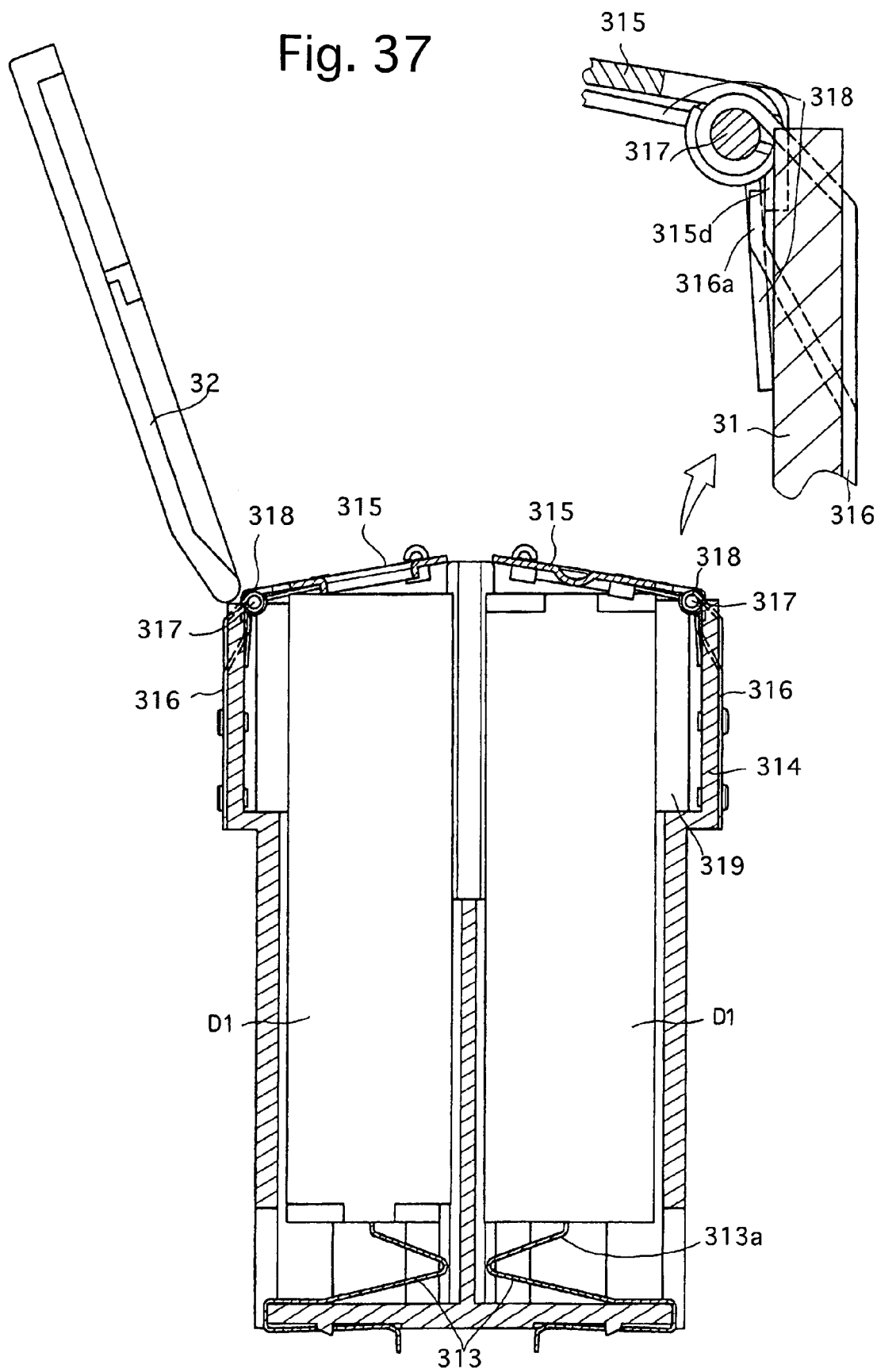
FIG. 37 is a longitudinal sectional view of the battery case shown in FIG. 26 in a state where AA-sized cells are partially inserted into the battery case.

After four AA-sized cells D1 have been inserted into the box portion 31, moving the two hinged plate contacts 315 back to the position shown in FIG. 37 in which the two hinged plate contacts 315 cover the bottom opening 311 causes the click piece 315*d* of each hinged plate contact 315 to move back across the click spring leaf 316*a* of the associated bearing plate 316 so that the two hinged plate contacts 315 substantially lie on the bottoms (upper ends as viewed in FIG. 37) of the associated two AA-sized cells D1 as shown in FIG. 37. However, in this state the four AA-sized cells D1 are biased downwards (upwards as viewed in FIG. 37) by the spring force of the four resilient contacts 313 that are installed in the box portion 31, and therefore, each hinged plate contact 315 is pushed outwards (upwards as viewed in FIG. 37) from the inside of the box portion 31 by the associated two AA-sized cells D1 to thereby be opened slightly as shown in FIG. 37.

Figure 38:
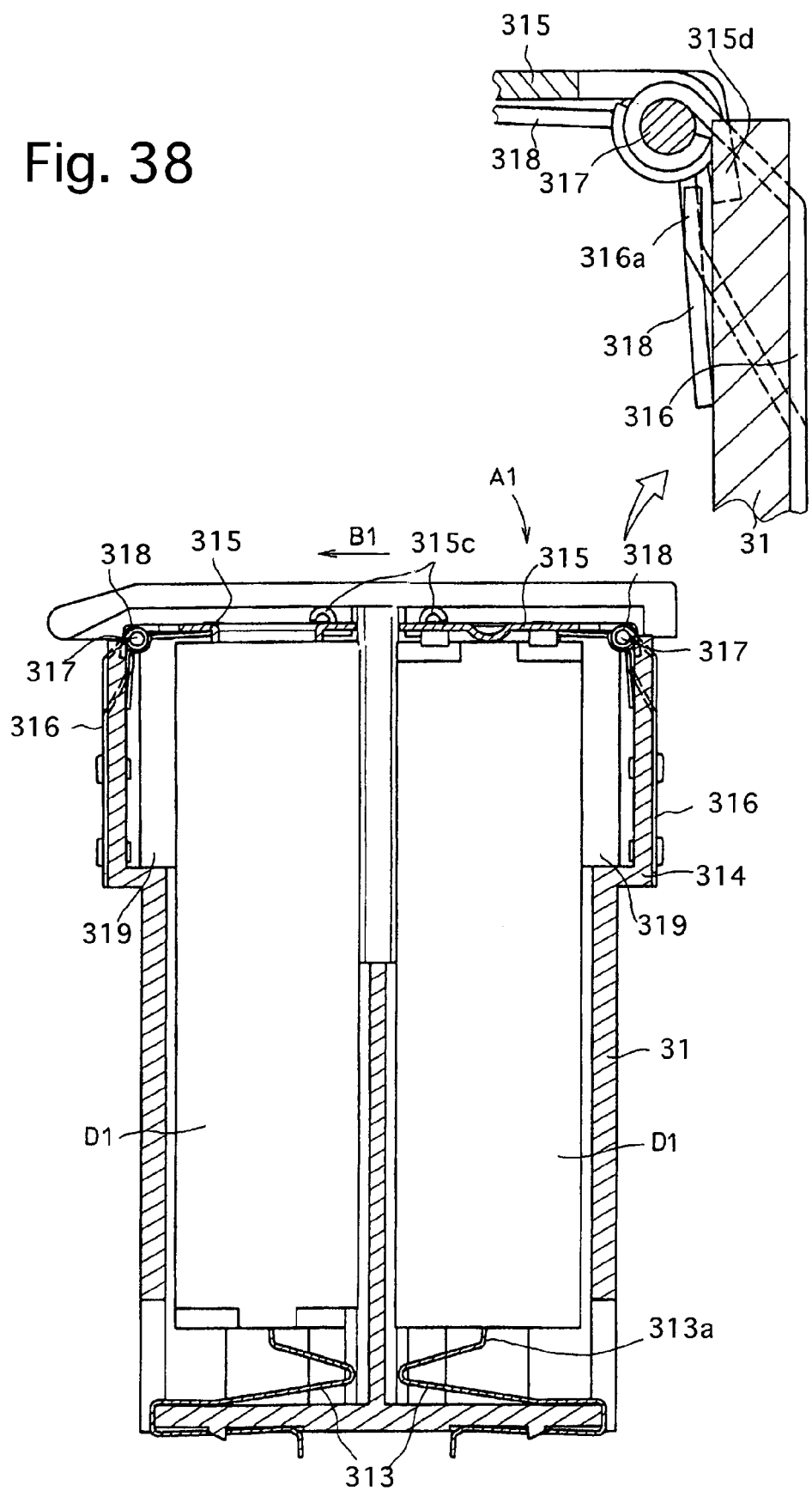
FIG. 38 is a longitudinal sectional view of the battery case shown in FIG. 26 in a state where AA-sized cells are fully inserted into the battery case while the battery chamber lid is closed.

Thereafter, if the battery chamber lid 32 is operated to rotate in the first rotation direction A1 to close the bottom opening 311, similar to the case using two CR-V3 batteries D2, the inner surface of the battery chamber lid 32 are brought into contact with the contacting projections 315*c* of the two hinged plate contacts 315 while the two hinged plate contacts 315 are pressed against the four AA-sized cells D1 by the battery chamber lid 32 as shown in FIG. 38. Therefore, electrodes of the accommodated four AA-sized cells D1 which are positioned on the top thereof, as viewed in FIG. 38, come in contact with the two hinged plate contacts 315 so that each pair of AA-sized cells D1 are connected in series. At the same time, the two hinged plate contacts 315 are positioned between the battery chamber lid 32 and the four AA-sized cells D1 accommodated in the box portion 31, and therefore, the four AA-sized cells D1 in the box portion 31 are pushed upwards (downwards as viewed in FIG. 38) by the battery chamber lid 32 and the two hinged plate contacts 315 so that the upper electrode (lower electrode as viewed in FIG. 38) of each AA-sized cell D1 comes in electrical contact with the end contact portion 313*a* of the associated resilient contact 313 by an appropriate spring force even though the AA-sized cell D1 is shorter in length than the CR-V3 battery D2. Thereafter, the closed state of the battery chamber lid 32 can be maintained by sliding the battery chamber lid 32 in the first sliding direction B1 to engage the two lid-locking lugs 322 (shown in FIG. 26) of the battery chamber lid 32 with the lid-locking lugs 312 of the box portion 311, respectively. Since each resilient contact 313 is designed so that the spring force exerted by the resilient contact 313 to the associated AA-sized cell D1 is small as described above, the battery chamber lid 32 can be operated to slide by a small force. As can be understood from the above description, when loading four AA-sized cells D1 into the battery case 30, it is necessary to open the two hinged plate contacts 315 and subsequently close the two hinged plate contacts 315, however, no other special operation needs to be performed, which simplifies the operating procedure for loading four AA-sized cells D1 into the battery case 30. Moreover, when the battery chamber lid 32 is operated to remove the four AA-sized batteries D1 out of the battery case 30, the battery chamber lid 32 can also be operated to slide by a small force though operated to slide in the second sliding direction B2. Upon the battery chamber lid 32 being opened, the two hinged plate contacts 315 can be opened with the aid of the spring force of each torsion coil spring 318 i.e., can be changed from the state shown in FIG. 35 to the state shown in FIG. 34 with the aid of the spring force of each torsion coil spring 318, so that the four AA-sized batteries D1 can be taken out of the box portion 31.

In this manner, CR-V3 batteries D2 can be loaded and unloaded properly, i.e., the battery chamber lid 32 can be opened and closed properly by a small force by designing each resilient contact 313 so as to exert an appropriate spring force to the associated CR-V3 battery D2 that has a relatively long length. On the other hand, when loading AA-sized cells D1 having a relatively short length is loaded into the battery case 30, because the two hinged plate contacts 315 are positioned between the battery chamber lid 32 and four AA-sized cells D1, the internal state of the battery case 30 in which four AA-sized cells D1 are accommodated becomes substantially the same as the internal state of the battery case 30 in which two CR-V3 batteries D2 are accommodated. This arrangement makes the amount of deformation of each resilient contact 313 substantially the same as when two CR-V3 batteries D2 are accommodated in the battery case 30, ensures a proper electrical contact between each resilient contact 313 and an electrode of associated one of the accommodated four AA-sized cells D1 by an appropriate spring force while ensuring a proper electrical contact between each hinged plate contact 315 and electrodes of the associated two of the accommodated four AA-sized cells D1, and allows the battery chamber lid 32 to be properly opened and closed by a small force in loading and unloading AA-sized cells D1.

It is possible to modify the battery case 30 so that the two hinged plate contacts 315 can be respectively accommodated in the two accommodation recesses 319 by sliding movements of the two hinged plate contacts 315, not rotating movements thereof. For instance, as shown in the longitudinal sectional views in FIGS. 39 and 40 that schematically show a portion of a modified version of the battery case 30 in which each hinged plate contact 315 can be accommodated into the associated accommodation recess 319, the box portion 31 is provided, on an inner surface thereof in each accommodation recess 319 on opposite sides of the associated pivot shaft 317, with a pair of guide grooves 31*d* (only one of them is shown in FIGS. 39 and 40) in which the opposite ends of the pivot shaft 317 are slidably engaged to be guided thereby in the lengthwise direction of the box portion 31. In FIGS. 39 and 40, the bearing plates 316 are not shown for the purpose of illustration. Although the battery case 30 is provided with the relatively-small-sized two torsion coil springs 318, the two torsion coil springs 318 can be omitted from the battery case 30. Namely, each hinged plate contact 315 can be simply pivoted about the associated pivot shaft 317.

In the embodiment shown in FIGS. 39 and 40, when two CR-V3 batteries D2 are loaded into the battery case 30, pressing each hinged plate contact 315 into the associated accommodation recess 319 causes the two pivot shafts 317 to slide in a direction shown by an arrow C1 shown in FIG. 40 along the pair of guide grooves 31*d* as shown in FIG. 40, thus making it possible to load the two CR-V3 batteries D2 into the battery case 30. On the other hand, when four AA-sized cells D1 are loaded into the battery case 30, each hinged plate contact 315 is made to slide to the outside of the bottom opening 311 by manually pulling the hinged plate contact 315 out of the bottom opening 311 while making each pivot shaft 317 move along the associated guide groove 31*d*. Thereafter, each hinged plate contact 315 is opened as shown in FIG. 39, and thereafter four AA-sized cells D1 are inserted into the box portion 31. After insertion of four AA-sized cells D1, the two hinged plate contacts 315 are closed to cover the exposed end surfaces of the inserted four AA-sized cells D1, and thereupon, the battery chamber lid 32 only needs to be closed. The four AA-sized cells D1 in the battery case 30 can be removed simply by operating the above described operations in inverse order.

In this embodiment shown in FIGS. 39 and 40 in which each hinged plate contact 315 is operated to slide along the pair of guide grooves 31*d*, the battery case 30 can be made simpler in structure than the battery case 30 shown in FIGS. 26 through 38 even though the number of manual operations necessary to be performed in accommodating the two hinged plate contact 315 in the two accommodation recesses 319 or positioning the two hinged plate contact 315 over four AA-sized cells D1 increases to some extent. Accordingly, the structure of the embodiment shown in FIGS. 39 and 40 can be effectively applied to a low-cost battery case.

Although the present invention has been described based on the above illustrated embodiments, the present invention is not limited solely to these particular embodiments. For instance, although several embodiments of battery cases each of which allows AA-sized cells and CR-V3 batteries to be selectively used have been described above, the present invention can also be applied to a battery case in which different types of batteries having different shapes and lengths can be used, in which the battery chamber lid is rotatable via a hinge and in which the battery chamber lid is locked by a sliding movement thereof. Moreover, the present invention can be applied to not only a battery case of a camera but also a battery case of any other type of battery-powered electronic device.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A battery case comprising:
   a box portion forming a battery chamber in which at least one short-length battery and at least one long-length battery can be selectively accommodated along a lengthwise direction of said box portion through an insertion opening thereof;
   a battery chamber lid for closing said insertion opening;
   at least one battery locking lug which is engaged with said long-length battery to lock said long-length battery in said box portion upon said long-length battery being inserted into said box portion; and
   at least one lock releasing piece which disengages said battery locking lug from said long-length battery when said battery chamber lid is opened from a closed state thereof.

2. The battery case according to claim 1, further comprising:
   at least one first lid-locking lug formed on said box portion; and
   at least one second lid-locking lug formed on said battery chamber lid,
   wherein said first lid-locking lug and said second lid-locking lug are engaged with each other by sliding said battery chamber lid in a first direction with said battery chamber lid being closed.

3. The battery case according to claim 2, wherein said first lid-locking lug and said second lid-locking lug are disengaged from each other by sliding said battery chamber lid in a second direction opposite to said first direction.

4. The battery case according to claim 1, wherein said battery locking lug comprises a resilient leaf portion formed by two slits formed on either side thereof on said box portion,
   wherein said resilient leaf portion is in a non-deformed state when engaged with said long-length battery, and
   wherein said long-length battery is disengaged from said resilient leaf portion upon said resilient leaf portion being resiliently deformed.

5. The battery case according to claim 4, wherein said resilient leaf portion comprises:
   a first beveled surface which is engaged with said lock releasing piece to guide said lock releasing piece in a direction of preventing said resilient leaf portion from being resiliently deformed when said battery chamber lid is moved in said first direction; and
   a second beveled surface which is engaged with said lock releasing piece to resiliently deform said resilient leaf portion via said lock releasing piece when said battery chamber lid is moved in said second direction.

6. The battery case according to claim 5, wherein said lock releasing piece is made of a resilient metal leaf which is resiliently deformable in a direction of the thickness thereof and comprises a beveled surface which is formed at a end of said resilient metal leaf to be inclined to both said first direction and said second direction,
   wherein said first beveled surface of said resilient leaf portion resiliently deforms said lock releasing piece in said direction of thickness thereof to prevent said lock releasing piece from interfering with said battery locking lug when said lock releasing piece is moved in said first direction, and
   wherein said second beveled surface of said resilient leaf portion comes in contact with said beveled surface of said lock releasing piece and deforms said battery locking lug when said lock releasing piece is moved in said second direction.

7. The battery case according to claim 1, wherein said at least one short-length battery comprises four short-length batteries,
   wherein said at least one long-length battery comprises two long-length batteries each having a width substantially double the width of each said short-length batteries and a length greater than the length of each said short-length batteries,
   wherein said at least one battery locking lug comprises two battery locking lugs which are engaged with said two long-length batteries to lock said two long-length batteries in said box portion upon said two long-length batteries being inserted into said box portion, respectively, and
   wherein said at least one lock releasing piece comprises two lock releasing pieces which disengage said two battery locking lugs from said two long-length batteries, respectively, when said battery chamber lid is opened from said closed state thereof.

8. The battery case according to claim 7, wherein said short-length battery comprises an AA-sized cell, and
   wherein said long-length battery comprises a CR-V3 battery.

9. The battery case according to claim 1, wherein said battery case is incorporated in a grip portion of a camera body of said camera.

10. The battery case according to claim 1, wherein at least one contact which comes in contact with an electrode of said short-length battery is fixed to an inner surface of said battery chamber lid when said battery chamber lid is closed with said short-length battery being accommodated in said box portion.

11. The battery case according to claim 10, wherein said contact and said lock releasing piece are fixed to said inner surface of said battery chamber lid to be positioned adjacent to each other.

12. The battery case according to claim 2, wherein said lock releasing piece is elongated in said first direction.

* * * * *